US012585970B1

(12) United States Patent
Shan et al.

(10) Patent No.: US 12,585,970 B1
(45) Date of Patent: Mar. 24, 2026

(54) SYSTEMS AND METHODS OF IMPLEMENTING SCORECARDS AND BOOSTED DECISION TREES

(71) Applicant: Experian Information Solutions, Inc., Costa Mesa, CA (US)

(72) Inventors: Honghao Shan, San Diego, CA (US); Liang Lin, San Diego, CA (US); Chi Zhang, San Diego, CA (US); Keming Cao, San Diego, CA (US); Zhe An, San Diego, CA (US); Shanji Xiong, Rancho Santa Fe, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 1068 days.

(21) Appl. No.: 17/534,175

(22) Filed: Nov. 23, 2021

Related U.S. Application Data

(60) Provisional application No. 63/117,940, filed on Nov. 24, 2020.

(51) Int. Cl.
G06N 5/04 (2023.01)
G06N 5/01 (2023.01)
G06N 20/20 (2019.01)

(52) U.S. Cl.
CPC ................. G06N 5/04 (2013.01); G06N 5/01 (2023.01); G06N 20/20 (2019.01)

(58) Field of Classification Search
CPC ............ G06N 5/04; G06N 5/01; G06N 20/20; G06Q 20/4016
See application file for complete search history.

(56) References Cited

U.S. PATENT DOCUMENTS 5,398,300 A    3/1995    Levey
5,504,675 A    4/1996    Cragun et al.
5,696,907 A    12/1997    Tom
(Continued)

FOREIGN PATENT DOCUMENTS

AU    2019250275    5/2020
AU    2020233739    10/2020
(Continued)

OTHER PUBLICATIONS

Extended European Search Report in EP Application No. 20157023.1, dated Sep. 25, 2020.

*Primary Examiner* — K C Chen
(74) *Attorney, Agent, or Firm* — Knobbe, Martens, Olson & Bear, LLP

(57) ABSTRACT

Systems and methods are described for machine learning-based generation of scorecards and boosted decision trees that facilitate explainable predictions. A scorecard machine learning model may be applied to historical records such that the model, for each of a number of variables, automatically generates (a) normal bins for normal values of the variable that fall within a valid range of values and (b) at least one special bin for special values of the variable that fall outside the valid range of values. Adjacent bins of the normal bins may be separated by a threshold value and each normal bin and each special bin may have an assigned score value. A risk assessment score may be generated based at least in part on the model identifying the assigned value score for each of the variables based on the normal or special bin to which each variable is assigned.

20 Claims, 16 Drawing Sheets

- Determine a variable to be split
  - Valid range: $[v_{min}, v_{max}]$    Special Value Set: $\{s_1, s_2, s_3, s_4, ...\} \notin [v_{min}, v_{max}]$

- Treat both special and valid values as categorical variables
  - Cut the valid values into two valid categorical buckets:
    $[v_{min}, v_{split}], (v_{split}, v_{max}], s_1, s_2, s_3, s_4$
  - Put the valid values into one categorical bucket
    $[v_{min}, v_{max}], s_1, s_2, s_3, s_4$
  - Evaluate any combination for best split
  - Enforce monotonicity on the valid values and protect best valid value when calculating splitting quality

(56) References Cited

U.S. PATENT DOCUMENTS

| | | | |
|---|---|---|---|
| 5,745,654 | A | 4/1998 | Titan |
| 5,774,868 | A | 6/1998 | Cragun et al. |
| 5,819,226 | A | 10/1998 | Gopinathan et al. |
| 5,870,721 | A | 2/1999 | Norris |
| 5,875,108 | A | 2/1999 | Hoffberg et al. |
| 5,912,839 | A | 6/1999 | Ovshinsky et al. |
| 6,029,139 | A | 2/2000 | Cunningham et al. |
| 6,115,693 | A | 9/2000 | McDonough et al. |
| 6,119,103 | A | 9/2000 | Basch et al. |
| 6,236,977 | B1 | 5/2001 | Verba |
| 6,330,546 | B1 | 12/2001 | Gopinathan et al. |
| 6,366,897 | B1 | 4/2002 | Means et al. |
| 6,393,406 | B1 | 5/2002 | Eder |
| 6,424,956 | B1 | 7/2002 | Werbos |
| 6,430,539 | B1 | 8/2002 | Lazarus et al. |
| 6,513,018 | B1 | 1/2003 | Culhane |
| 6,597,775 | B2 | 7/2003 | Lawyer et al. |
| 6,640,215 | B1 | 10/2003 | Galperin et al. |
| 6,654,727 | B2 | 11/2003 | Tilton |
| 6,658,393 | B1 | 12/2003 | Basch et al. |
| 6,804,346 | B1 | 10/2004 | Mewhinney |
| 6,839,682 | B1 | 1/2005 | Blume et al. |
| 6,850,606 | B2 | 2/2005 | Lawyer et al. |
| 6,873,979 | B2 | 3/2005 | Fishman et al. |
| 7,054,828 | B2 | 5/2006 | Heching et al. |
| 7,165,037 | B2 | 1/2007 | Lazarus et al. |
| 7,191,150 | B1 | 3/2007 | Shao et al. |
| 7,249,048 | B1 | 7/2007 | O'Flaherty |
| 7,376,618 | B1 | 5/2008 | Anderson et al. |
| 7,392,216 | B1 | 6/2008 | Palmgren et al. |
| 7,536,348 | B2 | 5/2009 | Shao et al. |
| 7,672,865 | B2 | 3/2010 | Kumar et al. |
| 7,702,576 | B2 | 4/2010 | Fahner et al. |
| 7,707,059 | B2 | 4/2010 | Reed et al. |
| 7,725,300 | B2 | 5/2010 | Pinto et al. |
| 7,774,272 | B2 | 8/2010 | Fahner et al. |
| 7,788,195 | B1 | 8/2010 | Subramanian et al. |
| 7,792,732 | B2 | 9/2010 | Haggerty et al. |
| 7,813,944 | B1 | 10/2010 | Luk et al. |
| 7,813,981 | B2 | 10/2010 | Fahner et al. |
| 7,836,111 | B1 | 11/2010 | Shan |
| 7,844,534 | B2 | 11/2010 | Haggerty et al. |
| 7,853,541 | B1 | 12/2010 | Kapadia et al. |
| 7,970,676 | B2 | 6/2011 | Feinstein |
| 7,991,677 | B2 | 8/2011 | Haggerty et al. |
| 7,991,689 | B1 | 8/2011 | Brunzell et al. |
| 8,027,894 | B2 | 9/2011 | Feinstein et al. |
| 8,065,234 | B2 | 11/2011 | Liao et al. |
| 8,078,569 | B2 | 12/2011 | Kennel |
| 8,099,356 | B2 | 1/2012 | Feinstein et al. |
| 8,131,614 | B2 | 3/2012 | Haggerty et al. |
| 8,175,945 | B2 | 5/2012 | Haggerty et al. |
| 8,200,595 | B1 | 6/2012 | De Zilwa et al. |
| 8,352,343 | B2 | 1/2013 | Haggerty et al. |
| 8,364,518 | B1 | 1/2013 | Blake et al. |
| 8,401,950 | B2 | 3/2013 | Lyons et al. |
| 8,423,488 | B2 | 4/2013 | Surpi |
| 8,458,074 | B2 | 6/2013 | Showalter |
| 8,676,726 | B2 | 3/2014 | Hore et al. |
| 8,694,427 | B2 | 4/2014 | Maddipati et al. |
| 8,775,291 | B1 | 7/2014 | Mellman et al. |
| 8,788,437 | B2 | 7/2014 | Prieditis |
| 8,805,737 | B1 | 8/2014 | Chen et al. |
| 8,984,022 | B1 | 3/2015 | Crawford et al. |
| 9,037,694 | B2 | 5/2015 | Winkler |
| 9,280,750 | B2 | 3/2016 | Prieditis |
| 9,390,379 | B2 | 7/2016 | Prieditis |
| 9,483,727 | B2 | 11/2016 | Zhao et al. |
| 9,660,869 | B2 | 5/2017 | Ripley et al. |
| 9,697,476 | B1 | 7/2017 | Prieditis |
| 9,779,187 | B1 | 10/2017 | Gao et al. |
| 9,838,301 | B2 | 12/2017 | Prieditis |
| 9,855,792 | B2 | 1/2018 | Delayre et al. |
| 10,083,263 | B2 | 9/2018 | Gao et al. |
| 10,097,647 | B2 | 10/2018 | Prieditis |
| 10,133,980 | B2 | 11/2018 | Turner et al. |
| 10,152,736 | B2 | 12/2018 | Yang et al. |
| 10,178,111 | B1 | 1/2019 | Wilson et al. |
| 10,242,019 | B1 | 3/2019 | Shan et al. |
| 10,366,342 | B2 | 7/2019 | Zhao et al. |
| 10,373,061 | B2 | 8/2019 | Kennel et al. |
| 10,402,723 | B1 | 9/2019 | Silberman et al. |
| 10,474,566 | B2 | 11/2019 | Indurthivenkata et al. |
| 10,535,009 | B2 | 1/2020 | Turner et al. |
| 10,558,913 | B1 | 2/2020 | Turner et al. |
| 10,643,154 | B2 | 5/2020 | Litherland et al. |
| 10,810,463 | B2 | 10/2020 | Min et al. |
| 10,942,842 | B2 | 3/2021 | Indurthivenkata et al. |
| 10,956,940 | B2 | 3/2021 | Rahman et al. |
| 10,963,791 | B2 | 3/2021 | Turner et al. |
| 10,963,817 | B2 | 3/2021 | Jordan et al. |
| 10,970,431 | B2 | 4/2021 | Chang et al. |
| 10,977,556 | B2 | 4/2021 | Turner et al. |
| 10,997,511 | B2 | 5/2021 | Turner et al. |
| 11,003,947 | B2 | 5/2021 | Zoldi et al. |
| 11,010,669 | B2 | 5/2021 | Turner et al. |
| 11,042,551 | B2 | 6/2021 | Fahner et al. |
| 11,049,012 | B2 | 6/2021 | Zoldi et al. |
| 11,049,019 | B2 | 6/2021 | Jordan et al. |
| 11,055,071 | B2 | 7/2021 | Oburu et al. |
| 11,100,392 | B2 | 8/2021 | Zhao et al. |
| 11,100,506 | B2 | 8/2021 | Zoldi et al. |
| 11,144,834 | B2 | 10/2021 | Zoldi et al. |
| 11,151,450 | B2 | 10/2021 | Zoldi et al. |
| 11,206,246 | B2 | 12/2021 | Krishnamacharya |
| 11,341,449 | B2 | 5/2022 | Krone et al. |
| 11,373,109 | B2 | 6/2022 | Zoldi et al. |
| 11,436,241 | B2 | 9/2022 | Kunjur |
| 11,461,383 | B2 | 10/2022 | Xie et al. |
| 11,468,260 | B2 | 10/2022 | Zoldi et al. |
| 11,468,315 | B2 | 10/2022 | Turner et al. |
| 11,475,235 | B2 | 10/2022 | Bondugula et al. |
| 11,494,294 | B2 | 11/2022 | Indurthivenkata et al. |
| 11,521,020 | B2 | 12/2022 | Liu et al. |
| 11,568,187 | B2 | 1/2023 | Huang et al. |
| 11,568,286 | B2 | 1/2023 | Nourian et al. |
| 11,645,581 | B2 | 5/2023 | Nourian et al. |
| 11,663,658 | B1 | 5/2023 | Zoldi et al. |
| 11,682,019 | B2 | 6/2023 | Zhang et al. |
| 11,687,804 | B2 | 6/2023 | Zoldi et al. |
| 11,693,634 | B2 | 7/2023 | Oburu et al. |
| 11,709,918 | B2 | 7/2023 | Zoldi et al. |
| 11,715,029 | B2 | 8/2023 | Ouyang et al. |
| 11,734,591 | B2 | 8/2023 | Turner et al. |
| 11,748,416 | B2 | 9/2023 | Hicklin et al. |
| 11,804,302 | B2 | 10/2023 | Fahner et al. |
| 11,818,147 | B2 | 11/2023 | Zoldi et al. |
| 11,868,891 | B2 | 1/2024 | Turner et al. |
| 11,875,232 | B2 | 1/2024 | Kennel et al. |
| 11,875,239 | B2 | 1/2024 | Huang et al. |
| 11,886,512 | B2 | 1/2024 | Ralph et al. |
| 2002/0147695 | A1 | 10/2002 | Khedkar et al. |
| 2002/0161664 | A1 | 10/2002 | Shaya et al. |
| 2003/0009368 | A1 | 1/2003 | Kitts |
| 2003/0115133 | A1 | 6/2003 | Bian |
| 2004/0034570 | A1 | 2/2004 | Davis et al. |
| 2004/0044615 | A1 | 3/2004 | Xue et al. |
| 2004/0153330 | A1 | 8/2004 | Miller et al. |
| 2005/0033734 | A1 | 2/2005 | Chess et al. |
| 2005/0159996 | A1 | 7/2005 | Lazaraus et al. |
| 2005/0197954 | A1 | 9/2005 | Maitland et al. |
| 2005/0262014 | A1 | 11/2005 | Fickes |
| 2006/0041464 | A1 | 2/2006 | Powers et al. |
| 2006/0129428 | A1 | 6/2006 | Wennberg |
| 2006/0212350 | A1 | 9/2006 | Ellis et al. |
| 2006/0277102 | A1 | 12/2006 | Agliozzo |
| 2006/0282359 | A1 | 12/2006 | Nobili et al. |
| 2007/0067208 | A1 | 3/2007 | Haggerty et al. |
| 2007/0112667 | A1 | 5/2007 | Rucker |
| 2007/0208653 | A1 | 9/2007 | Murphy |
| 2007/0226114 | A1 | 9/2007 | Haggerty et al. |
| 2007/0294163 | A1 | 12/2007 | Harmon et al. |
| 2008/0005313 | A1 | 1/2008 | Flake et al. |
| 2008/0028067 | A1 | 1/2008 | Berkhin et al. |

(56) References Cited

U.S. PATENT DOCUMENTS

| | | | |
|---|---|---|---|
| 2008/0097768 A1 | 4/2008 | Godshalk | |
| 2008/0140549 A1 | 6/2008 | Eder | |
| 2008/0208548 A1 | 8/2008 | Metzger et al. | |
| 2008/0208788 A1 | 8/2008 | Merugu et al. | |
| 2008/0221973 A1 | 9/2008 | Megdal et al. | |
| 2008/0228540 A1 | 9/2008 | Megdal et al. | |
| 2008/0294540 A1 | 11/2008 | Celka et al. | |
| 2009/0037323 A1 | 2/2009 | Feinstein et al. | |
| 2009/0222308 A1 | 9/2009 | Zoldi et al. | |
| 2009/0248567 A1 | 10/2009 | Haggerty et al. | |
| 2009/0248568 A1 | 10/2009 | Haggerty et al. | |
| 2009/0248569 A1 | 10/2009 | Haggerty et al. | |
| 2009/0248570 A1 | 10/2009 | Haggerty et al. | |
| 2009/0248571 A1 | 10/2009 | Haggerty et al. | |
| 2009/0248572 A1 | 10/2009 | Haggerty et al. | |
| 2009/0248573 A1 | 10/2009 | Haggerty et al. | |
| 2010/0169264 A1 | 7/2010 | O'Sullivan | |
| 2010/0274739 A1 | 10/2010 | Haggerty et al. | |
| 2011/0035333 A1 | 2/2011 | Haggerty et al. | |
| 2011/0078073 A1 | 3/2011 | Annappindi et al. | |
| 2011/0093383 A1 | 4/2011 | Haggerty et al. | |
| 2011/0112958 A1 | 5/2011 | Haggerty et al. | |
| 2011/0258142 A1 | 10/2011 | Haggerty et al. | |
| 2011/0264581 A1 | 10/2011 | Clyne | |
| 2011/0270779 A1 | 11/2011 | Showalter | |
| 2012/0035980 A1 | 2/2012 | Haggerty et al. | |
| 2012/0084230 A1 | 4/2012 | Megdal et al. | |
| 2012/0123968 A1 | 5/2012 | Megdal et al. | |
| 2013/0204755 A1 | 8/2013 | Zoldi et al. | |
| 2013/0268324 A1 | 10/2013 | Megdal et al. | |
| 2014/0012633 A1 | 1/2014 | Megdal et al. | |
| 2014/0324522 A1 | 10/2014 | Wilkins et al. | |
| 2015/0254568 A1* | 9/2015 | Zhao | G06N 20/00 |
| | | | 706/12 |
| 2015/0332414 A1 | 11/2015 | Unser | |
| 2017/0103340 A1 | 4/2017 | Zoldi et al. | |
| 2018/0025273 A1 | 1/2018 | Jordan et al. | |
| 2018/0060581 A1 | 3/2018 | El Moussa et al. | |
| 2019/0042947 A1 | 2/2019 | Turner et al. | |
| 2019/0156196 A1 | 5/2019 | Zoldi et al. | |
| 2019/0260839 A1 | 8/2019 | Prieditis | |
| 2019/0318255 A1 | 10/2019 | Ripley et al. | |
| 2019/0340526 A1 | 11/2019 | Turner et al. | |
| 2019/0354613 A1 | 11/2019 | Zoldi et al. | |
| 2019/0354853 A1 | 11/2019 | Zoldi et al. | |
| 2019/0362417 A1 | 11/2019 | Patten et al. | |
| 2020/0026642 A1 | 1/2020 | Indurthivenkata et al. | |
| 2020/0097881 A1 | 3/2020 | Krone et al. | |
| 2020/0104734 A1 | 4/2020 | Turner et al. | |
| 2020/0134387 A1 | 4/2020 | Liu et al. | |
| 2020/0134439 A1 | 4/2020 | Turner et al. | |
| 2020/0250556 A1 | 8/2020 | Nourian et al. | |
| 2020/0272853 A1 | 8/2020 | Zoldi et al. | |
| 2020/0279334 A1* | 9/2020 | Billings | G06Q 40/08 |
| 2020/0387832 A1 | 12/2020 | Jordan et al. | |
| 2020/0401894 A1 | 12/2020 | Turner et al. | |
| 2020/0410362 A1 | 12/2020 | Turner et al. | |
| 2021/0012418 A1 | 1/2021 | Feinstein et al. | |
| 2021/0042366 A1 | 2/2021 | Hicklin et al. | |
| 2021/0042647 A1 | 2/2021 | Turner et al. | |
| 2021/0049428 A1 | 2/2021 | Huang et al. | |
| 2021/0049503 A1 | 2/2021 | Nourian et al. | |
| 2021/0142914 A1 | 5/2021 | Hua et al. | |
| 2021/0144131 A1 | 5/2021 | Krishnamacharya | |
| 2021/0150532 A1 | 5/2021 | Zhang et al. | |
| 2021/0157717 A1 | 5/2021 | Indurthivenkata et al. | |
| 2021/0174264 A1 | 6/2021 | Jordan et al. | |
| 2021/0182690 A1 | 6/2021 | Jordan et al. | |
| 2021/0224673 A1 | 7/2021 | Turner et al. | |
| 2021/0240808 A1 | 8/2021 | Sadhwani et al. | |
| 2021/0241141 A1 | 8/2021 | Dugger et al. | |
| 2021/0248503 A1 | 8/2021 | Hickey | |
| 2021/0263942 A1 | 8/2021 | Zoldi et al. | |
| 2021/0294580 A1 | 9/2021 | Oburu et al. | |
| 2021/0295175 A1 | 9/2021 | Kennel et al. | |

| | | | |
|---|---|---|---|
| 2021/0342635 A1 | 11/2021 | Zoldi et al. | |
| 2021/0357679 A1 | 11/2021 | Bondugula et al. | |
| 2021/0357707 A1 | 11/2021 | Bondugula et al. | |
| 2021/0406703 A1 | 12/2021 | Zoldi et al. | |
| 2021/0406724 A1 | 12/2021 | Zoldi et al. | |
| 2022/0103589 A1 | 3/2022 | Shen et al. | |
| 2022/0147817 A1 | 5/2022 | Boardman et al. | |
| 2022/0166782 A1 | 5/2022 | Zoldi et al. | |
| 2022/0188644 A1 | 6/2022 | Zoldi et al. | |
| 2022/0207324 A1 | 6/2022 | Hamilton et al. | |
| 2022/0261821 A1 | 8/2022 | Burton et al. | |
| 2022/0319701 A1 | 10/2022 | Fahner et al. | |
| 2022/0321394 A1 | 10/2022 | Huang et al. | |
| 2022/0326997 A1 | 10/2022 | Pradhan et al. | |
| 2022/0335348 A1 | 10/2022 | Miller et al. | |
| 2022/0374744 A1 | 11/2022 | Zoldi et al. | |
| 2022/0391435 A1 | 12/2022 | Xie et al. | |
| 2022/0391793 A1 | 12/2022 | Latimer et al. | |
| 2022/0414469 A1 | 12/2022 | Turner et al. | |
| 2023/0008208 A1 | 1/2023 | Bondugula et al. | |
| 2023/0023630 A1 | 1/2023 | Hamilton et al. | |
| 2023/0046601 A1 | 2/2023 | Hamilton et al. | |
| 2023/0080851 A1 | 3/2023 | Zoldi et al. | |
| 2023/0085575 A1 | 3/2023 | Zoldi et al. | |
| 2023/0100730 A1 | 3/2023 | Liu et al. | |
| 2023/0111785 A1 | 4/2023 | Joshua et al. | |
| 2023/0113118 A1 | 4/2023 | Guo et al. | |
| 2023/0121564 A1 | 4/2023 | Zou et al. | |
| 2023/0162053 A1 | 5/2023 | Patel et al. | |
| 2023/0177397 A1 | 6/2023 | Huang et al. | |
| 2023/0196136 A1 | 6/2023 | Campolong et al. | |
| 2023/0196147 A1 | 6/2023 | McBurnett et al. | |
| 2023/0205893 A1 | 6/2023 | Gjorvad et al. | |
| 2023/0206134 A1 | 6/2023 | Kennel et al. | |
| 2023/0214677 A1 | 7/2023 | Alfred et al. | |
| 2023/0214784 A1* | 7/2023 | Kakade | G16H 40/20 |
| | | | 705/7.19 |
| 2023/0216866 A1 | 7/2023 | Monnig et al. | |
| 2023/0244905 A1 | 8/2023 | Zoldi et al. | |
| 2023/0283628 A1 | 9/2023 | Johnston | |
| 2023/0297847 A1 | 9/2023 | Turner et al. | |
| 2023/0319036 A1 | 10/2023 | Singh et al. | |
| 2023/0325724 A1 | 10/2023 | Ouyang et al. | |
| 2023/0342605 A1 | 10/2023 | Sankaran et al. | |
| 2023/0351210 A1 | 11/2023 | Murray et al. | |
| 2023/0359672 A1 | 11/2023 | Ralph et al. | |
| 2023/0359767 A1 | 11/2023 | Ralph et al. | |
| 2023/0359883 A1 | 11/2023 | Ralph et al. | |
| 2023/0367821 A1 | 11/2023 | Hicklin et al. | |
| 2024/0005150 A1* | 1/2024 | Dugger | G06N 5/01 |
| 2024/0013919 A1 | 1/2024 | Fahner et al. | |
| 2024/0013926 A1 | 1/2024 | Hua et al. | |

FOREIGN PATENT DOCUMENTS

| | | |
|---|---|---|
| AU | 2021200434 | 2/2021 |
| AU | 2021232839 | 10/2021 |
| AU | 2022203061 | 5/2022 |
| AU | 2022204452 | 7/2022 |
| AU | 2022204580 | 7/2022 |
| AU | 2022204732 | 7/2022 |
| AU | 2021273576 | 3/2023 |
| AU | 2022256086 | 5/2023 |
| AU | 2022291564 | 7/2023 |
| AU | 2023203714 | 7/2023 |
| CA | 3 039 182 | 5/2018 |
| CA | 3 059 314 | 3/2020 |
| CA | 3 134 595 | 9/2023 |
| CA | 2 980 166 | 10/2023 |
| EP | 0 554 083 | 8/1993 |
| EP | 3 572 985 | 11/2019 |
| EP | 3 690 762 | 8/2020 |
| EP | 3 699 827 | 8/2020 |
| EP | 3 719 710 | 10/2020 |
| EP | 3 852 019 | 7/2021 |
| EP | 3 862 897 | 8/2021 |
| EP | 3 866 072 | 8/2021 |
| EP | 3 923 207 | 12/2021 |
| EP | 3 933 702 | 1/2022 |

(56)　　　　References Cited

FOREIGN PATENT DOCUMENTS

| | | |
|---|---|---|
| EP | 4 006 782 | 6/2022 |
| EP | 3 332 320 | 4/2023 |
| EP | 4 224 309 | 8/2023 |
| EP | 3 710 927 | 10/2023 |
| GB | 2 579 139 | 6/2020 |
| WO | WO 94/006103 | 3/1994 |
| WO | WO 00/055789 | 9/2000 |
| WO | WO 00/055790 | 9/2000 |
| WO | WO 2008/127288 | 10/2008 |
| WO | WO 2016/160539 | 10/2016 |
| WO | WO 2016/164680 | 10/2016 |
| WO | WO 2017/024242 | 2/2017 |
| WO | WO 2017/053347 | 3/2017 |
| WO | WO 2018/049154 | 3/2018 |
| WO | WO 2018/057701 | 3/2018 |
| WO | WO 2018/081623 | 5/2018 |
| WO | WO 2018/084867 | 5/2018 |
| WO | WO 2018/236732 | 12/2018 |
| WO | WO 2019/050864 | 3/2019 |
| WO | WO 2019/088972 | 5/2019 |
| WO | WO 2019/089439 | 5/2019 |
| WO | WO 2019/089990 | 5/2019 |
| WO | WO 2019/094910 | 5/2019 |
| WO | WO 2019/104088 | 5/2019 |
| WO | WO 2019/104089 | 5/2019 |
| WO | WO 2019/152592 | 8/2019 |
| WO | WO 2019/182593 | 9/2019 |
| WO | WO 2019/217876 | 11/2019 |
| WO | WO 2020/198236 | 10/2020 |
| WO | WO 2021/034932 | 2/2021 |
| WO | WO 2021/050346 | 3/2021 |
| WO | WO 2021/097090 | 5/2021 |
| WO | WO 2021/138271 | 7/2021 |
| WO | WO 2021/173501 | 9/2021 |
| WO | WO 2022/020162 | 1/2022 |
| WO | WO 2022/031412 | 2/2022 |
| WO | WO 2022/031523 | 2/2022 |
| WO | WO 2022/032285 | 2/2022 |
| WO | WO 2022/072989 | 4/2022 |
| WO | WO 2022/104329 | 5/2022 |
| WO | WO 2022/104357 | 5/2022 |
| WO | WO 2022/178192 | 8/2022 |
| WO | WO 2022/261600 | 12/2022 |
| WO | WO 2023/059356 | 4/2023 |
| WO | WO 2023/060150 | 4/2023 |
| WO | WO 2023/063970 | 4/2023 |
| WO | WO 2023/063971 | 4/2023 |
| WO | WO 2023/063972 | 4/2023 |
| WO | WO 2023/086954 | 5/2023 |
| WO | WO 2023/107134 | 6/2023 |
| WO | WO 2023/115019 | 6/2023 |
| WO | WO 2023/129977 | 7/2023 |
| WO | WO 2023/192175 | 10/2023 |

* cited by examiner $$f(x_1, x_2, \ldots, x, \ldots, x_{n-1}, x_n) \leq f(x_1, x_2, \ldots, x', \ldots, x_{n-1}, x_n)$$
$$\text{whenever } x \leq x'$$

$$\overline{y_1} \leq \overline{y_2}$$

$$\overline{y_3} \leq \overline{y_4}$$

$$\frac{\overline{y_1} + \overline{y_2}}{2} \leq \overline{y_5} \leq \frac{\overline{y_3} + \overline{y_4}}{2}$$

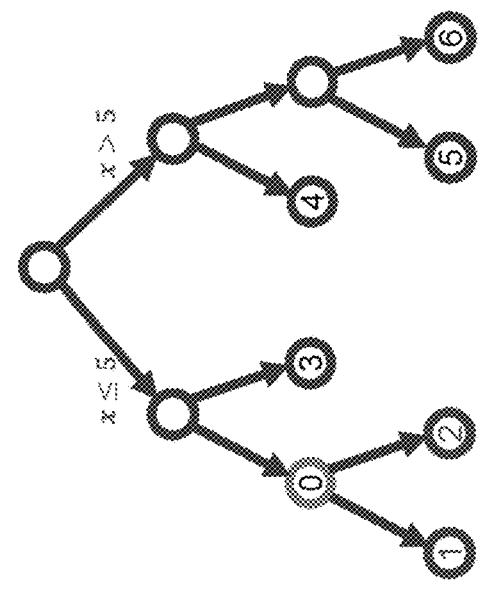

- Allow the target values of the two new leaf nodes as well as the existing leaf nodes to optimize.

- Suppose the decision tree minimizes the squared errors. This can be cast as a constrained optimization problem:

$$\text{minimize} \sum_{j=1}^{k} \sum_{\text{sample } i \text{ under node } j} \left( y^i - \overline{y}_j \right)^2$$

$$\text{subject to } \overline{y}_1 \leq \overline{y}_2, \, \overline{y}_2 \leq \overline{y}_3, \, \ldots$$

FIG. 9B

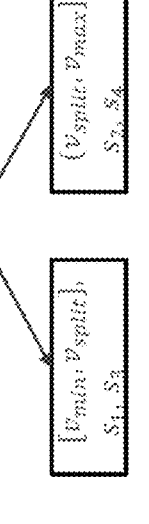

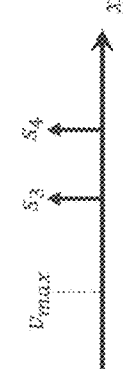

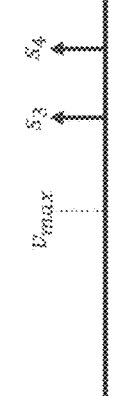

- Determine a variable to be split
  - Valid range: $[v_{min}, v_{max}]$    Special Value Set: $\{s_1, s_2, s_3, s_4, \ldots\} \notin [v_{min}, v_{max}]$

- Treat both special and valid values as categorical variables
  - Cut the valid values into two valid categorical buckets:

$[v_{min}, v_{split}], (v_{split}, v_{max}], s_1, s_2, s_3, s_4$

- Put the valid values into one categorical bucket $[v_{min}, v_{max}], s_1, s_2, s_3, s_4$

- Evaluate any combination for best split

- Enforce monotonicity on the valid values and protect best valid value when calculating splitting quality

FIG. 12

SYSTEMS AND METHODS OF IMPLEMENTING SCORECARDS AND BOOSTED DECISION TREES

CROSS-REFERENCE TO RELATED APPLICATIONS

This application claims the benefit of U.S. Provisional Application No. 63/117,940, filed on Nov. 24, 2020, the entirety of which is hereby incorporated herein by reference.

BACKGROUND

In the current age of technology, machine learning models impact many aspects of everyday life. In many instances, these models are black boxes that are overly complicated and hard to interpret or understand for external reviewers. But as these models become more prevalent, public concern grows about whether such models are making good (for example, sound and fair) decisions. For example, there are various instances of such black box machine learning models generating improper results in prison parole and air quality safety scenarios, among others. Furthermore, there are various regulated industries in which uses of machine learning models may be difficult from a compliance perspective because the company or other entity involved in training and/or operating the model may not be able to effectively explain why the model leads to a particular result in a given circumstance.

Accordingly, improved systems, devices, and methods for efficiently and effectively developing or learning models that are more easily capable of being understood rather than viewed as effectively a black box (and, therefore, easier to review, verify and/or explain with respect to corresponding outputs) are described in further detail herein.

BRIEF DESCRIPTION OF THE DRAWINGS

The above-mentioned aspects, as well as other features, aspects, and advantages of the present technology will now be described in connection with various aspects, with reference to the accompanying drawings. The illustrated aspects, however, are merely examples and are not intended to be limiting. Throughout the drawings, similar symbols typically identify similar components, unless context dictates otherwise. Note that the relative dimensions of the following figures may not be drawn to scale. The following drawings and the associated descriptions are provided to illustrate embodiments of the present disclosure and do not limit the scope of the claims. Moreover, the relative dimensions of the following figures may not be drawn to scale.

FIGS. 9A and 9B show a comparison of monotonicity constraints implementation in traditional GBDT models (FIG. 9A) relative to EGBDT models discussed herein (FIG. 9B).

FIG. 12 shows how special values can be treated as categorical variables to achieve optimal performance and flexibility in an EGBDT implementation.

DETAILED DESCRIPTION

Figure 1:
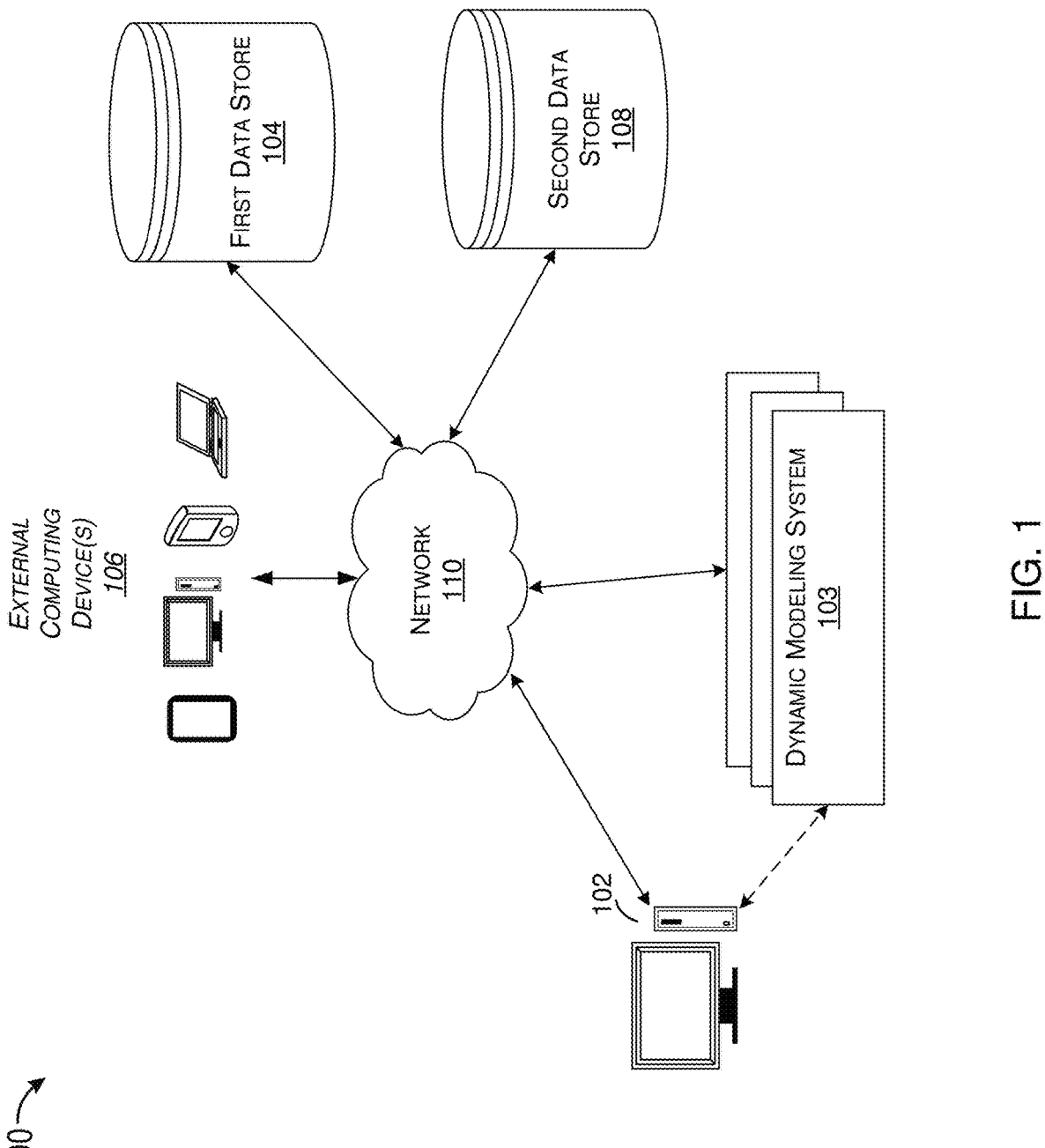
FIG. 1 shows a network diagram of various components that communicate via a communication network (hereinafter "network") and form a risk assessment platform that generates, trains, and applies machine learning (ML) models to records and/or information available to and/or processed by the risk assessment platform.

The present disclosure relates to systems and methods of developing scorecards and boosted decision trees that facilitate more robust, and interpretable predictions or decisions relative to existing approaches and systems. More specifically, certain systems and methods described herein employ a scorecard and boosted decision tree tool that can be applied to risk prediction and decision-making problems in finance, medicine, criminal justice, and various other fields.

Systems and methods are described herein for machine learning-based generation of scorecards and boosted decision trees that facilitate explainable predictions. A scorecard machine learning model may be applied to historical records such that the model, for each of a number of variables, automatically generates (a) normal bins for normal values of the variable that fall within a valid range of values and (b) at least one special bin for special values of the variable that fall outside the valid range of values. Adjacent bins of the normal bins may be separated by a threshold value and each normal bin and each special bin may have an assigned score value. A risk assessment score may be generated based at least in part on the model identifying the assigned value score for each of the variables based on the normal or special bin to which each variable is assigned.

A constrained optimization based score card as described herein supports a wide variety of constraints, including a monotonisity constraint, cross variable constraint, and best bin protection zero score constraint. Also described herein are novel penalties or regularizations to significantly improve model robustness and reliability. An EGBDT algorithm as described herein is capable of handling multiple default values, replacing heuristics by start-of-the-art optimization when enforcing monotonicity constraints, and relaxed unnecessary over-constraints in traditional GDBT implementations. The EGBDT algorithm and constrained optimization based score card techniques described herein can be combined together to achieve modeling efficiency and robust performance in production. EGBDT techniques can be applied to performance initial attribute selection and optimal binning. A constrained optimization based score card as described herein can train robust final models based on the outcome from the EGBDT process.

Although certain embodiments and examples are disclosed below, inventive subject matter extends beyond the specifically disclosed embodiments to other alternative embodiments and/or uses and to modifications and equivalents thereof. Thus, the scope of the application is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Machine learning and similar models are used in various industries to perform predictive analysis of or on large amounts of data. The machine learning models may involve application of algorithms to inputs, whereby the algorithms generate outputs that generally improve with respect to quality of the outputs and predictive capabilities associated therewith as the algorithms and models are exposed to more input data. In some embodiments, the models may be trained using training or sample data before being applied to generate one or more outputs. Such ML models are often considered to be black boxes that are difficult to understand, in the sense that it may be difficult for an operator of the model (or reviewer of the results of the model) to explain why the model made a certain prediction, classification or produced some other output when given a certain set of input features. For example, it may be difficult to explain to a person what factors caused an ML model to suggest denying the person a loan or what caused the model to output a particular risk score based on a large set of input data regarding the person.

Scorecard models, as described herein, are a class of machine learning models that systems and methods often apply to facilitate quick and interpretable predictions or decisions. While various ML models can provide for risk prediction and solutions to various problems in finance, medicine, criminal justice, and other professional domains, as described above, many of these models are overly complicated and difficult to interpret. The lack of explainability and transparency regarding operation of the ML models (such as multi-layered neural network models that include a large number of weights within multiple layers) and the corresponding systems and methods raises concerns regarding decisions and results reached by the models. The scorecard models described herein provide simple and interpretable models to solve problems described herein while enabling desired problem solving.

Many entities that employ machine learning have been trying to address the concerns of lack of transparency and the like by implementing more explainable artificial intelligence (AI) systems and methods, and more specifically, more explainable ML models. The simple and interpretable ML models enable modelers (and other third party entities) to easily inspect the learnings (for example, patterns learned and applied by) the ML models so that the modelers and others can decide and/or determine whether the outputs generated by the ML models are correct as compared to previous complicated ML models that operated as black boxes and were difficult to inspect.

For example, in a financial setting, a ML model can be applied to a dataset with individuals who recently had defaults on their credit cards to determine a probability that the individual would default on a newly approved credit card. The simple and interpretable ML model applied in this financial data set may generate a result indicating that the individual has a lower probability to default on the newly approved credit card as compared to individuals with no recent delinquencies. The simple and interpretable ML model may arrive at this result based on analyzing similar situations and learning that often credit lenders will only approve a tiny percentage of individuals having recent defaults (such as this consumer) and upon whom the credit lenders have done very thorough inspections and are confident that an additional default is unlikely. The simple and interpretable ML model will allow the modeler or other entity to easily review the analysis and learning of the ML model and identify that the result of the simple and interpretable ML model is accurate based on input data. Thus, if the simple and interpretable ML model was generating incorrect outputs, the modeler could identify how to impose standard regularization penalties or constraints to improve or limit the outputs of the simple and interpretable ML model. On the other hand, the complicated ML model may arrive at this same erroneous result based on picking up a false pattern from the modeling dataset (e.g., the pattern of recent defaults). However, the modeler or other entities cannot easily determine from an analysis of the complicated ML model that the model will make this error in the analysis and, therefore, cannot easily limit the output of the complicated ML model by imposing standard regularization penalties.

The simple and interpretable ML models also find application in various industries because modeling data (for example, data used to train and test the ML model) may not always match data inputs applied to the ML models in the future. A fundamental assumption of ML modeling is that the corresponding systems, methods, and modelers train and test the ML models using data that is generally from a similar underlying distribution as the data on which the ML models are to be applied. This assumption, however, may be improper in certain fields, such as the financial field. Accordingly, the ML models applied in the financial field (and similar fields) should be available for inspection and analysis regarding whether the ML models have picked up patterns that may only apply to historical data or otherwise mischaracterize future data.

The systems and methods described herein implement scorecard models that encapsulate state-of-the-art techniques for binning, regularization, and optimization, among others. In particular, the systems and methods described herein implement scorecard tools that, according to at least some embodiments: (1) incorporate novel constraints used in corresponding modeling; (2) perform binarsity regularization that promotes model simplicity; (3) utilize efficient techniques to optimize the model parameters; and (4) perform a novel type of supervised binning by training a boosted decision tree model with stumps.

The scorecard tools are based on scorecard type ML models that are easily inspected and interpreted to verify outputs and functionality of the ML models. The disclosure below provides approaches to train the scorecard models, useful techniques to increase training speeds, and considerations for constraining behavior of the scorecard models.

Additionally, the systems and methods described herein introduce various constraints that may be applied to the scorecard tools described herein, such as protected bins and/or zero-base instances. Additionally, the systems and methods may introduce techniques to efficiently optimize ML model parameters. Furthermore, the systems and methods herein described a new binning scheme, whereby bin cuts for each variable of the binning scheme are determined by constructing a boosted decision tree model consisting of a large number of stumps, which can also serve to build a scorecard model. The disclosure below also illustrates efficiencies and benefits of introducing a binarsity penalty to ML model outputs as compared to standard penalties (for example, a standard L1 penalty) or utilizing supervised binning.

Exemplary Term Descriptions

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary definitions.

Data Store: Includes any computer readable storage medium and/or device (or collection of data storage mediums and/or devices). Examples of data stores include, but are not limited to, optical disks (for example, CD-ROM, DVD-ROM, and so forth), magnetic disks (for example, hard disks, floppy disks, and so forth), memory circuits (for example, solid state drives, random-access memory ("RAM"), and so forth), and/or the like. Another example of a data store is a hosted storage environment that includes a collection of physical data storage devices that may be remotely accessible and may be rapidly provisioned as needed (commonly referred to as "cloud" storage).

Database: Includes any data structure (and/or combinations of multiple data structures) for storing and/or organizing data, including, but not limited to, relational databases (for example, Oracle databases, MySQL databases, and so forth), non-relational databases (for example, NoSQL databases, and so forth), in-memory databases, spreadsheets, as comma separated values ("CSV") files, extendible markup language ("XML") files, TeXT ("TXT") files, flat files, spreadsheet files, and/or any other widely used or proprietary format for data storage. Databases are typically stored in one or more data stores. Accordingly, each database referred to herein (for example, in the description herein and/or the figures of the present application) is to be understood as being stored in one or more data stores.

Database Record and/or Record: Includes one or more related data items stored in a database. The one or more related data items making up a record may be related in the database by a common key value and/or common index value, for example.

Output, Event Notification, Notification, and/or Alert: Includes electronic any notification sent from one computer system to one or more other computing systems. For example, a notification may indicate a new record set or changes to one or more records of interest. Notifications may include information regarding the record change of interest, and may indicate, for example, to a user, an updated view of the data records. Notifications may be transmitted electronically, and may cause activation of one or more processes, as described herein.

Historical data (also referred to as event data) may generally refer, in some embodiments, to data associated with any event associated with the individual, such as historical financial data, medical data, and so forth. The historical data may include transaction data, historical records, and so forth for various individuals. The transaction data may also include non-financial exchanges, such as login activity, Internet search history, Internet browsing history, posts to a social media platform, medical history, criminal history, or other interactions. In some implementations, the users may be machines interacting with each other (e.g., machine-to-machine communications). Transaction data may be presented in raw form. Raw transaction data generally refers to transaction data as received by the transaction processing system from a third-party transaction data provider. Transaction data may be compressed. Compressed transaction data may refer to transaction data that may be stored and/or transmitted using fewer resources than when in raw form. Compressed transaction data need not be "uncompressible." Compressed transaction data preferably retains certain identifying characteristics of the user associated with the transaction data such as behavior patterns (e.g., spend patterns), data cluster affinity, or the like.

Entity: depending on the context, may refer to a person, such as an individual, consumer, or customer, and/or may refer to an entity that provides input to the system and/or an entity that utilizes a device to receive the event notification, notification or alert (for example, a user who is interested in receiving notifications upon the occurrence of the newly generated record set or changes to records of interest). Thus, in the first context, the terms "user," "individual," "consumer," "business person," and "customer" should be interpreted to include single persons, as well as groups of users, such as, for example, married couples or domestic partners, organizations, groups, and business entities. Additionally, the terms may be used interchangeably. In some embodiments, the terms refer to a computing device of a user rather than, or in addition to, an actual human operator of the computing device.

An entity may generally refer to one party involved in a transaction. In some implementations, an entity may be a merchant or other provider of goods or services to one or more users, a financial institution, a bank, a credit card company, a hospital, a local government, an individual, a lender, or a company or organization of some other type.

A model may generally refer to a machine learning construct which may be used by a computing system to automatically generate a result or outcome. A model may be trained. Training a model generally refers to an automated machine learning process to generate the model that accepts an input and provides a result or outcome as an output. A model may be represented as a data structure that identifies, for a given value, one or more correlated values. For example, a data structure may include data indicating one or more categories. In such implementations, the model may be indexed to provide efficient look up and retrieval of category values. In other embodiments, a model may be developed based on statistical or mathematical properties and/or definitions implemented in executable code without necessarily employing machine learning.

Overview

Embodiments of the present disclosure may enable various entities (for example, hospital, financial institutions, local government, schools, and the like) to determine risk assessment scores for an individual based on historical references for the individual. The embodiments apply various machine learning (ML) and/or artificial intelligence (AI) algorithms to data stores that include, among other information, historical records for the individual and historical records for other individuals with similar histories. The embodiments may generate risk assessment scores and/or analyses for the individual based on the historical information.

Exemplary System

FIG. 1 shows a network diagram of various components that communicate via a communication network 110 (hereinafter "network"), such as the Internet, and form a risk assessment platform 100 that generates, trains, and applies ML models to records and/or information available to and/or processed by the risk assessment platform 100. The platform 100 comprises the network 110, a dynamic ML modeling system 103, a computing device 102, a first data store 104, a second data store 108, and external computing device(s) 106. The network 110 includes communication links shown enabling communication among the components of the platform 100.

The computing device 102 is shown communicatively coupled to the dynamic modeling system 103 via an optional localized manner (for example, via an optional local communication link, the optional nature indicated by a dashed communication link between the dynamic modeling system 103 and the computing device 102) and in an external manner where communications occur through the network 110. In some embodiments, the dynamic modeling system 103 is integrated into the computing device 102 or vice versa. Furthermore, in some embodiments, one or more of the first data store 104 and the second data store 108 are combined into a single data store that is local to the computing device 102 or remote from the computing device 102 (not shown). In some embodiments, two or more of the components shown in FIG. 1 above are integrated, one or more components are excluded, or one or more components not shown in FIG. 1 are added to the platform 100. The platform 100 may be used to implement systems and methods described herein.

In some embodiments, the network 110 may comprise any wired or wireless communication network by which data and/or information may be communicated between multiple electronic and/or computing devices. The network 110 may be used to interconnect nearby devices or systems together, employing widely used networking protocols. The various aspects described herein may apply to any communication standard, such as a wireless 802.11 protocol. The computing device 102 may comprise any computing device configured to transmit and receive data and information via the network 110 for an entity or in response to a request from the entity. The entity may be a financial institution such as a business, bank, credit card company, a non-profit organization, an educational institution, a healthcare provider, an insurer, and any other unit that can utilize risk assessment information or generate risk assessment information. In some embodiments, the request is a request to compute a risk score or similar score for an identified individual. The computing device 102 may include or have access to one or more databases (for example, the first data store 104 and the second data store 108) that include various records and information that may be used to generate attributes, determinations, and/or scores for risk assessment for an individual, company, and so forth and generate outputs corresponding thereto. These attributes (and corresponding information) may be used to dynamically generate ML models, for example scorecard ML models, used to generate risk assessment scores and associated information for use in risk prediction problems.

The computing devices 102, 106 may comprise any computing device configured to transmit and receive data and information via the network 110 for application by the dynamic modeling system 103, which generates, trains, and applies ML models to the data in response to received requests. In some embodiments, the computing device 102 represents a centralized computing device that performs at least a portion of the processing described herein. For example, the computing device 102 implements the scorecard ML models described herein to generate probability scores or other results. The computing device 102 may further analyze records stored in the first data store 104 and/or the second data store 108 (or provided with the score request) and generate an output regarding the particular entities or identities and/or perform one or more actions based on the performed analysis and/or the transmitted and received data and information. In some embodiments, the computing devices 106 represent a customer or user device that the customer or user utilizes to access the platform 100 and submit a request and/or data based on which the platform 100 applies the scorecard model(s) to determine a risk assessment score for an identified individual.

In some embodiments, the one or more computing devices 102, 106 comprise mobile or stationary computing devices. In some embodiments, the computing devices 106 provide users with remote access to the network 110 and the platform 100.

The first data store 104 may comprise one or more databases or data stores and may also store data regarding any identities (for example, name information, address information, activity information, and so forth). Using an example use case, the first data store 104 comprises credit score data that includes name information, address information, contact information, financial information, as well as other credit related data. In some embodiments, the credit score database may provide data for individuals or entities within particular geographic areas or for the entire platform 100.

The second data store 108 may also comprise one or more databases or data stores from a different source as compared to the first data store 104. The second data store 108 may also store data regarding corresponding to entities or identities, for example relationship data, transaction data, behavioral data, and so forth. In the example use case, the second data store 108 comprises one or more of property rental or ownership information, membership data, marketing data, public records data, business information, eCommerce data, digital browsing or footprint data, location data, and so forth. This data may be organized based on or according to identifiers common between the first data store 104 and the second data store 108, and so forth. In some embodiments, one or more of the first data store 104 and the second data store 108 comprise data from publicly available and/or private sources.

The dynamic modeling system 103 may process data from the first data store 104 and the second data store 108 and also dynamically generate and/or apply one or more artificial intelligence models based on requests or inputs provided by users via the computing devices 106. The dynamic modeling system 103 may dynamically apply one or more machine learning models to data obtained from one or more of the first data store 104, the second data store 108, and/or the users (via the one or more computing devices 106). In some embodiments, the machine learning models may be generated or adapted dynamically by the dynamic modeling system 103 as the inputs and data change. For example, the dynamic modeling system 103 may generate changing ML (or other artificial intelligence) models in real-time based on the inputs received from the user (for example, a particular identifier, and so forth). In some embodiments, the generated models themselves may be dynamically applied to the inputs and data. For example, the ML models generated by the dynamic modeling system 103 may create various score, metrics, and/or data points based on the data sourced from the first and second data stores 104 and 108, respectively, and the users (for example, filters, threshold criteria, and so forth). In some embodiments, the dynamic modeling system 103 may automatically adjust the machine learning models to meet pre-selected levels of accuracy and/or efficiency.

In some embodiments, the dynamic modeling system 103 adapts to data from the first data store 104, the second data store 108, or from users that is constantly changing. For example, the data in the first data store 104 and the second data store 108 is constantly updated and is different for each analysis of an identifier or entity. Using the example use case, a first user associated with a first financial institution may be interested in determining whether a first individual is likely to default on a loan based on the first individual's historical financial data in view of a first set of requirements, which is stored in one of the first data store 104 and the second data store 108. A second user from a second financial institution may be interested in determining whether the first individual is likely to default based on a second set of requirements or a different set of data (for example, just the historical data provided in the request). Accordingly, the data to which the ML models are applied by the dynamic modeling system 103 will likely be constantly changing in some embodiments. Thus, the processing and/or model generation performed by the platform 100 may change for each user, each request, each individual, and so forth. Additionally, the data obtained from the first and second data stores 104 and 108 will likely change over time as records in the data stores are updated, replaced, and/or deleted. Accordingly, the dynamic modeling system 103 may dynamically generate and/or apply machine learning models to handle constantly changing data and requests.

Based on the user requests, as will be detailed herein, the requests may be filtered to eliminate those requests that need not be completed. For example, in the example use case, requests may be filtered to eliminate those requests that are predetermined to have particular risk assessment scores (for example, previously determined scores that were determined within a specified threshold of time). Accordingly, the dynamic modeling system 103 may reduce unnecessary data processing by excluding certain requests.

In various embodiments, large amounts of data are automatically and dynamically processed interactively in response to user inputs, and the calculated data is efficiently and compactly presented to a user by the platform 100. Thus, in some embodiments, the data processing, machine learning, and generating of outputs and/or user interfaces described herein are more efficient as compared to previous data processing and output generation.

The various machine learning models and processing of data to identify risk assessment scores and comparisons, dynamic data processing, and output generation of the present disclosure are the result of significant research, development, improvement, iteration, and testing. This non-trivial development has resulted in the machine learning models and output generation described herein, which may provide significant efficiencies, improvements in accuracy and consistency, and advantages over previous systems.

Various embodiments of the present disclosure provide improvements to various technologies and technological fields. For example, as described above, existing data storage and processing technology (including, for example, in memory databases) is limited in various ways (for example, manual data review is slow, costly, and less detailed; data is too voluminous; and so forth, and existing ML models are too abstract and not explainable and can result in improper or incorrect outputs when applied to the data in the first and second data stores 104 and 108), and various embodiments of the disclosure provide significant improvements over such technology. Additionally, various embodiments of the present disclosure are inextricably tied to computer technology. In particular, various embodiments rely on application of machine learning models, acquisition and processing of data, and presentation of output information via interactive graphical user interfaces or reports. Such features and others (for example, processing and analysis of large amounts of electronic data) are intimately tied to, and enabled by, computer technology, and would not exist except for computer technology. For example, the interactions with data sources and displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, more accurate and consistent processing of, and presentation of, various types of electronic data. Furthermore, the scorecard models described herein may improve model governance, implementation, accountability, and performance. In some instances, the systems and methods described herein may be employed in marketing, insurance underwriting, fraud detection, and similar use cases for individuals and/or businesses.

Dynamic Modeling System

Figure 2:
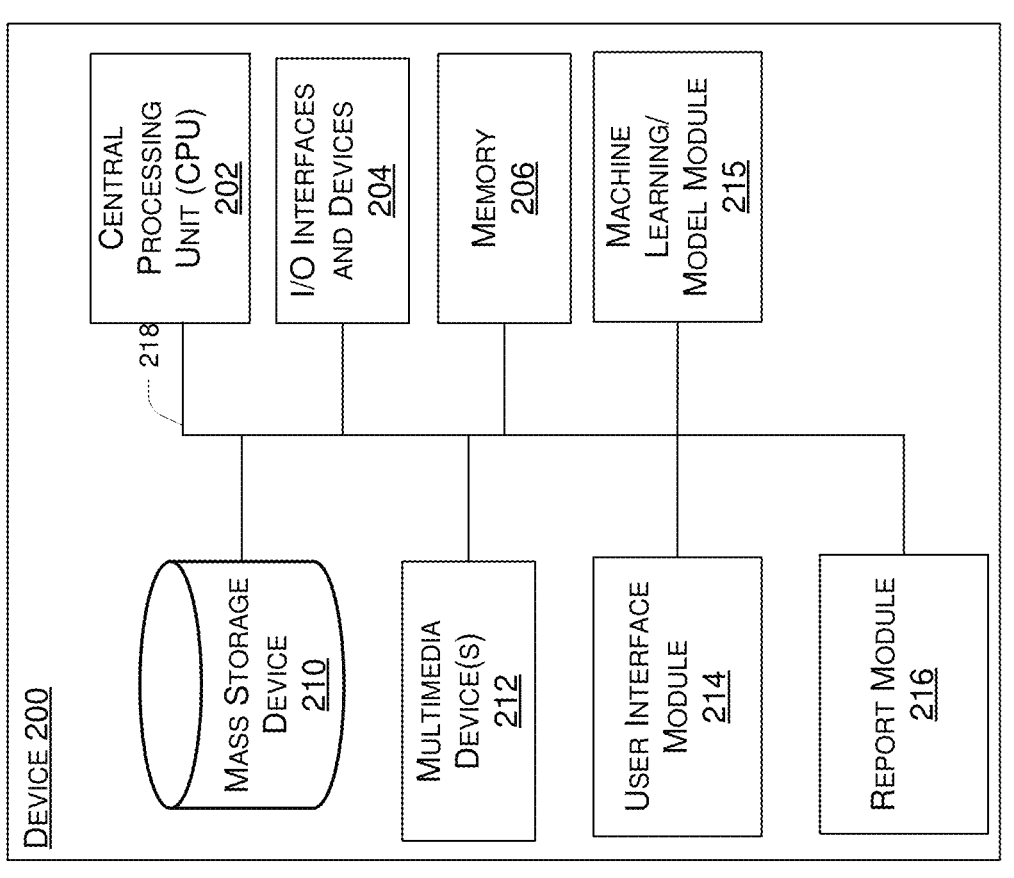
FIG. 2 is a block diagram corresponding to an aspect of a hardware and/or software component of an example embodiment of a device in the system of FIG. 1.

FIG. 2 is a block diagram corresponding to an aspect of a hardware and/or software component of an example embodiment of a device 200 in the system 100 of FIG. 1. The hardware and/or software components, as discussed below with reference to the block diagram of the device 200 may be included in any of the components of the system 100 (for example, the dynamic modeling system 103, the computing device 102, the external computing devices 106, and so forth). These various depicted components may be used to implement the systems and methods described herein.

In some embodiments, certain modules described below, such as a user interface module 214, a ML/modeling module 215, or a report module 216 included with the dynamic modeling system 103 may be included with, performed by, or distributed among different and/or multiple devices of the system 100. For example, certain user interface functionality described herein may be performed by the user interface module 214 of various devices such as the computing device 106.

In some embodiments, the various modules described herein may be implemented by either hardware or software.

In an embodiment, various software modules included in the device 200 may be stored on a component of the device 200 itself (for example, a local memory 206 or a mass storage device 210), or on computer readable storage media or other component separate from the device 200 and in communication with the device 200 via the network 110 or other appropriate means.

The device 200 may comprise, for example, a computer that is IBM, Macintosh, or Linux/Unix compatible or a server or workstation or a mobile computing device operating on any corresponding operating system. In some embodiments, the device 200 interfaces with a smart phone, a personal digital assistant, a kiosk, a tablet, a smart watch, a car console, or a media player. In some embodiments, the device 200 may comprise more than one of these devices. In some embodiments, the device 200 includes one or more central processing units ("CPUs" or processors) 202, I/O interfaces and devices 204, memory 206, the mass storage device 210, a multimedia device 212, the user interface module 214, the modeling module 215, the report module 216, and a bus 218.

The CPU 202 may control operation of the dynamic modeling system 103. The CPU 202 may also be referred to as a processor. The processor 202 may comprise or be a component of a processing system implemented with one or more processors. The one or more processors may be implemented with any combination of general-purpose microprocessors, microcontrollers, digital signal processors ("DSPs"), field programmable gate array ("FPGAs"), programmable logic devices ("PLDs"), controllers, state machines, gated logic, discrete hardware components, dedicated hardware finite state machines, or any other suitable entities that can perform calculations or other manipulations of information. In some embodiments, the CPU 202 may perform one or more of the steps or processes described herein, for example a computing step, training of the ML models, or application of the ML models, and so forth.

The I/O interface 204 may comprise a keypad, a microphone, a touchpad, a speaker, and/or a display, or any other commonly available input/output ("I/O") devices and interfaces. The I/O interface 204 may include any element or component that conveys information to the user of the device 200 (for example, a requesting financial entity, a hospital, a local government, educators, or any other entity) and/or receives input from the user. In one embodiment, the I/O interface 204 includes one or more display devices, such as a monitor, that allows the visual presentation of data to the user. More particularly, the display device provides for the presentation of GUIs, application software data, websites, web apps, and multimedia presentations, for example.

In some embodiments, the I/O interface 204 may provide a communication interface to various external devices. For example, the dynamic modeling system 103 and/or the consumer devices 106 are electronically coupled to the network 110 (FIG. 1), which comprises one or more of a LAN, WAN, and/or the Internet. Accordingly, the I/O interface 204 includes an interface allowing for communication with the network 110, for example, via a wired communication port, a wireless communication port, or combination thereof. The network 110 may allow various computing devices and/or other electronic devices to communicate with each other via wired or wireless communication links.

The memory 206, which includes one or both of read-only memory (ROM) and random-access memory ("RAM"), may provide instructions and data to the processor 202. For example, data received via inputs received by one or more components of the dynamic modeling system 103 and/or the consumer devices 106 may be stored in the memory 206. A portion of the memory 206 may also include non-volatile random-access memory ("NVRAM"). The processor 202 typically performs logical and arithmetic operations based on program instructions stored within the memory 206 and program instructions received from other sources. The instructions in the memory 206 may be executable to implement the methods described herein. In some embodiments, the memory 206 may be configured as a database and may store information that is received via the user interface module 214 or the I/O interfaces and devices 204.

The device 200 also includes the mass storage device 210 for storing software, executable instructions or information (for example, the generated models or data obtained to which the models are applied), and so forth. Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein. Accordingly, the dynamic modeling system 103 and/or the consumer devices 106 may include, for example, hardware, firmware, and software, or any combination therein. The mass storage device 210 may comprise a hard drive, diskette, solid state drive, or optical media storage device. In some embodiments, the mass storage device may be structured such that the data stored therein is easily manipulated and parsed.

As shown in FIG. 2, the dynamic modeling system 103 includes the modeling module 215. As described herein, the modeling module 215 may dynamically generate one or more models for data obtained from the data stores or the user. In some embodiments, the modeling module 215 may also apply the generated models to the data. In some embodiments, the one or more models may be stored in the mass storage device 210 or the memory 206. In some embodiments, the modeling module 215 may be stored in the mass storage device 210 or the memory 206 as executable software code that is executed by the processor 202. This, and other modules in the dynamic modeling system 103, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2, the dynamic modeling system 103 is configured to execute the modeling module 215 to perform the various methods and/or processes as described herein.

In some embodiments, the report module 216 may be configured to generate a report, notification, or output mentioned and further described herein. In some embodiments, the report module 216 may utilize information received from the dynamic modeling system 103, the data acquired from the data stores, and/or the user of the consumer device 106 to generate the report, notification, or output for a specific entity (for example, a client or customer) looking to establish a relationship with the individual for whom the risk assessment is requested. For example, the dynamic modeling system 103 may receive information from a client entity via the network 110 that the dynamic modeling system 103 uses to acquire information from the first and second data stores 104 and 108, respectively and generate and apply models for processing of the information from the client and/or from the data stores and identify corresponding risk assessment scores or values or information. In some embodiments, the generated report, notification, or output may comprise a data file including the risk assessment score and/or factors contributing to the risk assessment score. In some embodiments, the generated report, notification, or output does not include any personal identifying information (PII) of the consumers whose risk assessment score (or ranking or similar value) was generated. In some embodiments, the report module 216 may include information received from the client in the generated report, notification, or output.

The user interface module 214 may be configured to generate and/or operate user interfaces of various types. In some embodiments, the user interface module 214 constructs pages, applications or displays to be displayed in a web browser or computer/mobile application. In some embodiments, the user interface module 214 may provide an application or similar module for download and operation on a computer or system through which the client may interface with the dynamic modeling system 103 to obtain the desired report or output. The pages or displays may, in some embodiments, be specific to a type of device, such as a mobile device or a desktop web browser, to maximize usability for the particular device. In some embodiments, the user interface module 214 may also interact with a client-side application, such as a mobile phone application, a standalone desktop application, or user communication accounts (for example, e-mail, SMS messaging, and so forth) and provide data as necessary to display vehicle equity and prequalification determinations.

For example, as described herein, the dynamic modeling system 103 may be accessible to the client (for example a healthcare provider, financial institution or other entity) via a website or similar interface. The interface may request that the client provide details for the consumers or individuals for which the client wants to obtain risk assessment scores, rankings or other results. This may include a request for particular segment to which the consumer(s) belong and/or details of the product and/or service that the client provides.

Once the dynamic modeling system 103 receives the user inputs, the client user may view the received information via the I/O interfaces and devices 204 and/or the user interface module 214. Once the dynamic modeling system 103 receives the corresponding information from the data stores (for example, via the I/O interfaces and devices 204 or via the user interface module 214), the processor 202 or the modeling module 215 may store the received inputs and information in the memory 206 and/or the mass storage device 210. In some embodiments, the received information from the data stores may be parsed and/or manipulated by the processor 202 or the dynamic modeling system 103 (for example, filtered or similarly processed), before the generated models are applied to the information.

In some embodiments, one or more of the processor 202 and the modeling module 215 employs machine learning or similar algorithms and/or systems to generate models according to which scores, categorization results or other output are determined. In some embodiments, the ML performed by and/or models applied by the system 100 and/or the dynamic modeling system 103 may make associations between the individual's history (for example, information in the records in the first and second data stores 104 and 108, respectively) and histories for other individuals having similar circumstances and/or parameters. For example, the ML may use information from the individual's credit history in combination with individuals' credit histories that have had similar circumstances (for example, that are determined to be similar to the individual) to generate and/or train the models for analyzing the individual's historical credit information and generating the risk assessment scores based thereon. In some embodiments, the ML continuously updates, improves, and trains the models used to associate individual histories to current requests. For example, the models will be adapted to make stronger and better associations between histories and risk assessments based on identifying and/or reviewing previous individual histories and corresponding risk assessment information for the individual or another individual and monitoring the results for previously assessed individuals (for example, whether the risk assessments were accurate). Such review may help the system 100 and/or the dynamic modeling system 103 to better predict custom results based on prior "successes" and "failures" from previous individuals.

Furthermore, the scorecard models (as associated systems and methods) improve memory usage and corresponding efficiencies and enable improved parallel computation of scoring and weight information. Additionally, the systems and methods herein introduce a newly designed special data structure that expedites high-dimensional matrix computations.

As such, machine learning may be performed by the system 100 and/or the dynamic modeling system 103 to identify data sources for the individual's history and the historical information associated with individuals in similar circumstances, and the system may use the information from these data sources (and information for other individuals in a consumer group to which the individual belongs) to build one or more models to predict the customized risk assessment score and corresponding information.

In some embodiments, a user using the computing device 102 may access the dynamic modeling system 103 (for example via the computing device 106 operating as a server that provides risk assessments as a service or similar response to requests). The dynamic modeling system 103 (or the computing device 106) may provide an interface allowing the user to request a risk assessment for an individual. The user may be allowed to identify one or more variables to be considered in the risk assessment and/or select what data to be considered for the risk assessment.

Based on the received request, the dynamic modeling system 103 may obtain records for the individual from one or more of the data stores 104 and 108 and apply one or more scorecard models (and potentially additional models to train and/or apply the scorecard models) to the individual's records to generate a risk assessment score for the individual. The scorecard ML models may generate the risk assessment score for the individual based on identifying values in the individual's records for variables processed by the scorecard model and scoring those individual values and variables. Further details of the scorecard models and corresponding additional models are described below.

In some embodiments, the user may configure the risk assessment and application of the scorecard ML models to the records. For example, the user may identify what variables to use for the ML models applied what weights to apply to particular bins, etc., number of bins, sparsity penalties to apply, what constraints to apply to any models (for example, monotonicity constraints, best bin protection, zero base scores, enforcing cross-variable constraints, and so forth). The user may select an optimization method to apply to the scorecard ML model (as described further below) or provide files of parameters to apply to operation of the ML models to generate the risk assessment.

Scorecard Models

Scorecard ML models, as described herein, are mathematical models which can provide a quantitative estimate of a probability that a target entity (for example, an entity for which risk assessment information is desired or requested) will display a defined behavior based on corresponding input data. In financial industries, the defined behavior may be loan default, bankruptcy, or any other type of delinquency. In healthcare industries, the defined behavior may be illness or physical conditions, while in criminal justice, the defined behavior may be recidivism. The scorecard ML models are generally built and optimized to evaluate the input dataset of a homogeneous population (for example, entities with similar conditions, histories, etc., as the target entity) of any number of variables. The scorecard ML models may use observations or data from the population in combination with observations for entities that are not in the population. The scorecard ML models may apply various estimation techniques to generate risk assessment scores or outputs, for example logistic regression, that can be used to create estimates of the probability of the defined behavior by applying the estimation techniques to the input dataset. Thus, the scorecard ML model can be used to predict probability of the defined behavior for different or new entity using the same observation characteristics related to the defined behavior. The identified or resulting probabilities can then be scaled to a corresponding "score" or likelihood. This score can be used to rank entities according to the likelihood or probability that the entity will result in the defined behavior without explicitly identifying the entities' probabilities of the defined behavior occurring. The scorecard ML model may alternatively or additionally apply estimation or prediction techniques such as: hazard rate modeling, weight of evidence models, linear or logistic regression, and the like.

A scorecard ML model may be interpreted as an extension of linear regression, logistic regression, or similar ML models. The scorecard ML models may generally be applicable to risk prediction problems and the like. The scorecard ML models may be favorable to practitioners due to the simplicity and ease of interpretation of the scorecard ML models.

Figure 3A:
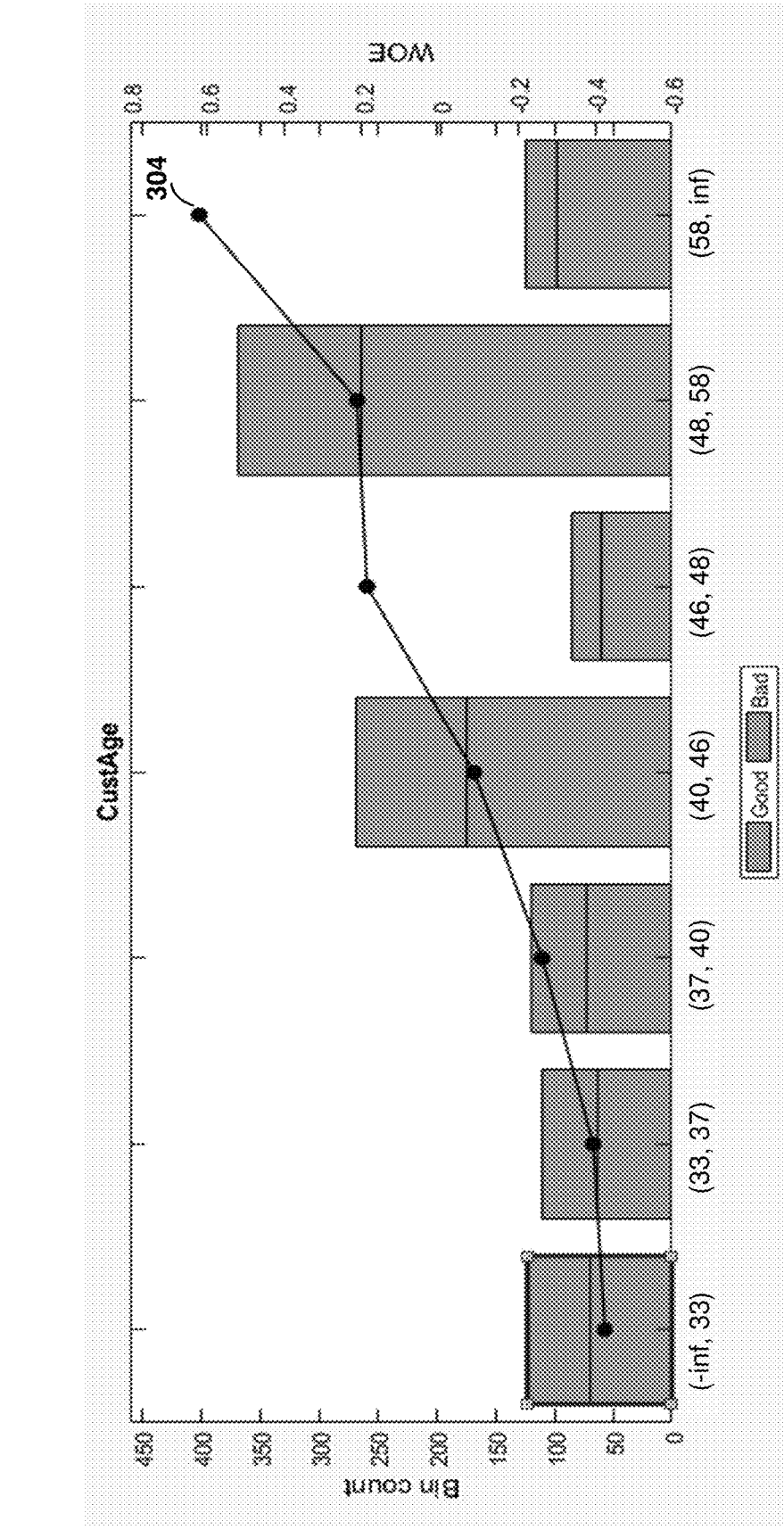
FIGS. 3A-3C show example graphical representations of binning performed in association with a traditional scorecard model and a scorecard model as described herein.

Traditional scorecard models may apply or employ monotonic binning, where each variable is associated with a corresponding weight of evidence (WOE). An example of the traditional scorecard model applied to identifying different bins for customer ages is shown in FIG. 3A. In this example, the variable $x_j$ may fall into a $k^{th}$ bin according to the following formula:

$$xj \rightarrow WOE_{j,k} := \log\left(\frac{G_{j,k}/G}{B_{j,k}/B}\right)$$

The WOEs are monotonic (meaning they are either non-increasing or non-decreasing when viewed collectively), where $WOE_{j,k} \leq WOE_{j,k+1}$ and each variable has a non-negative weight $w_j$. A traditional scoring model may generate score values according to Equation 1, for example:

$$S(x_i; w, w_0) = w_0 + \sum_{j=1}^{p} w_j WOE_{j,k}$$

Equation 1

Such a traditional scoring model may be trained using Equation 2, for example:

$$\min_{w} \frac{1}{n} \sum_{i=1}^{n} l(y_i, S(x_i; w, w_0)) + R(w)$$

$$\text{s.t.} \quad w_j \geq 0, \forall j$$

Equation 2

The training equation includes a regularization parameter or penalty, $R(w)$.

FIG. 3A shows a graph 302 of bins according to customer age along the x-axis and bin count (number of samples in each bin) and WOE along the y-axis. Each bin of ages is separated into a "good" portion and a "bad" portion. These good and bad portions may be determined relative to the bin count. The line 304 represents the WOE for each bin, where the WOE is monotonic as it progresses up the bin groups left to right in the graph 302. The WOE shown by the line 304 for each bin is determined, based on the equation above, using the good and bad portions of the bin. However, the traditional scorecard model may employ a linear model between the score and the WOE associated with each variable, and the linear model may not be capable of fully capturing the interaction among the variables. Furthermore, while the traditional scorecard may be able to enforce monotonicity constraints, other types of constraints, such as cross-variable constraints and binarsity constraints may be able to be imposed.

Figure 3B:
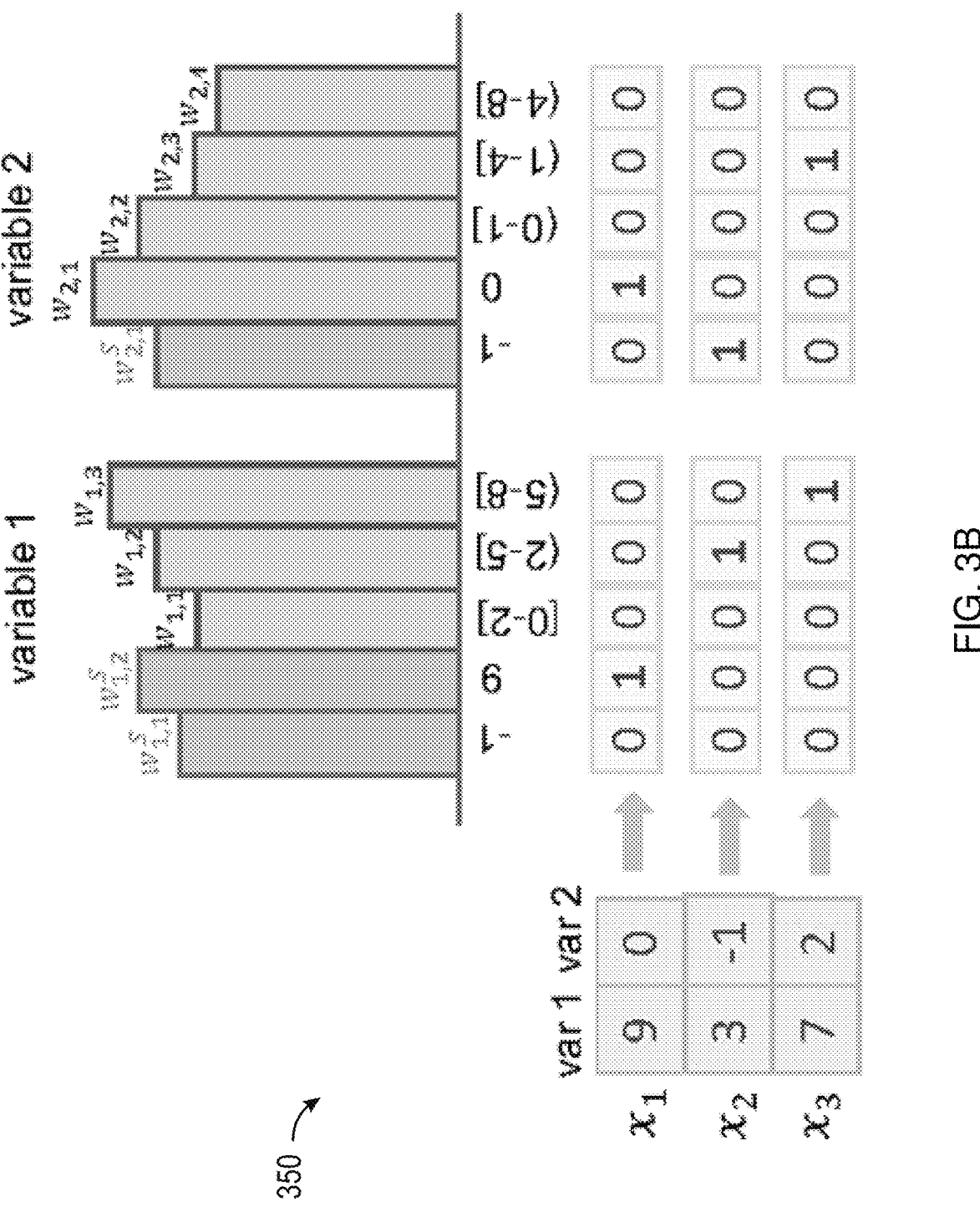
Figure 3C:
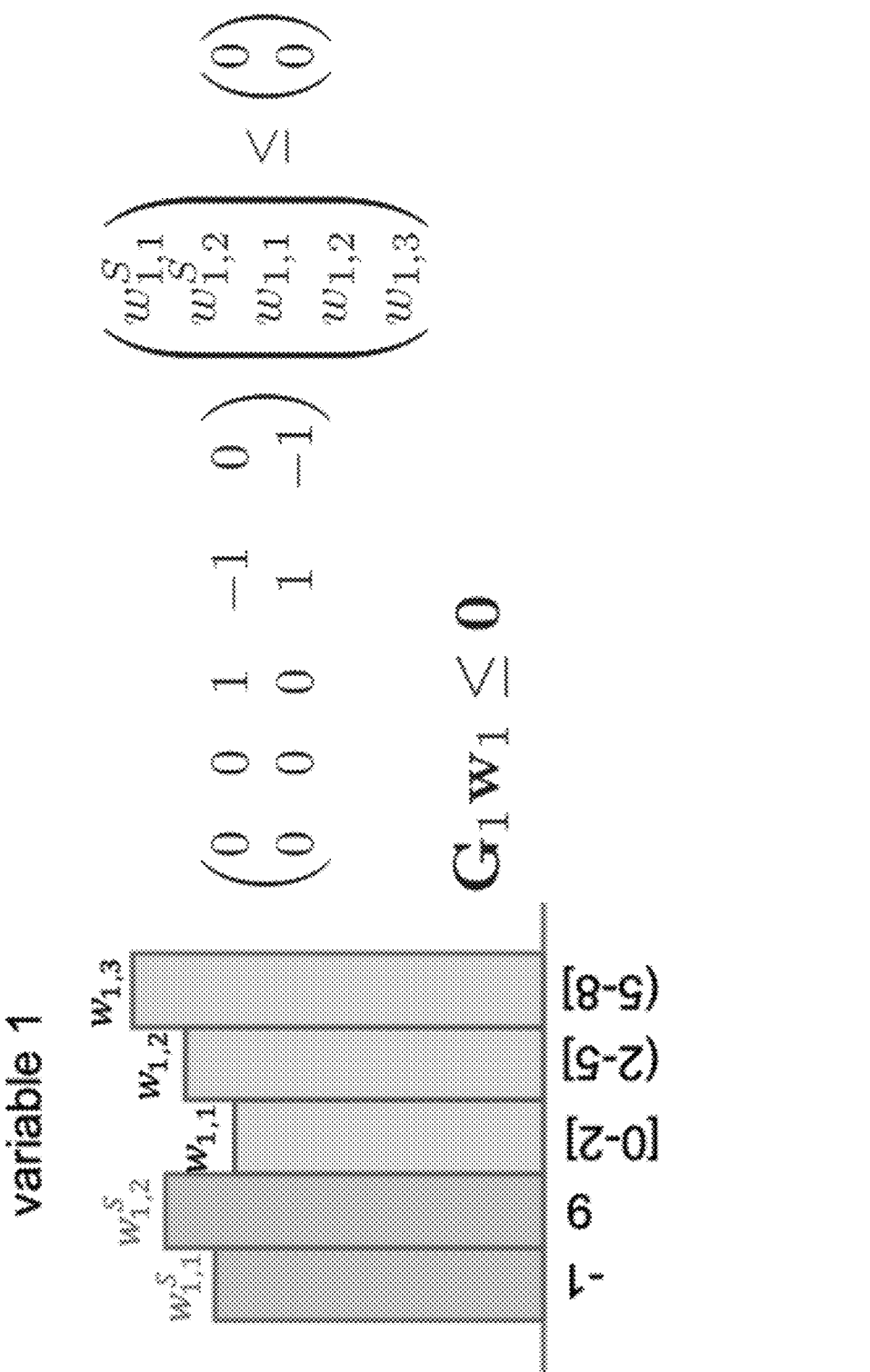

The scorecard models described herein may employ a different binning approach, specifically utilizing equal-sized binning, or quantile-based binning, within the normal range of a variable of interest. FIG. 3B shows a representation of binning with two variables for special and normal bins, as used by the scorecard models described herein according to some embodiments. Special values or default values usually fall outside of a normal range, and each special value is assigned to a distinct bin. The equalized sized bins may be distributed in the normal range defined between a defined minimum value and a defined maximum value. Thus, there are $t_j$ bins in the range between the minimum and maximum values and $r_j$ bins for the special values. More specifically, FIG. 3B provides a simple example of binning with two variables. Weights associated with the normal bins and the special bins of variable 1 are denoted as $w_{1,k}$ and $w^s_{1,k'}$ for $k=1, 2, 3$ and $k'=1, 2$, respectively. Notations are similar for variable 2. Non-decreasing and non-increasing monotonicity constraints are imposed on the normal bin weights of variable 1 and variable 2, respectively. For the three samples $\{x_i\}^3_{i=1}$, the map $\phi(xi)$ is concatenated by one-hot encoders of bin assignment for each variable, as described further below.

For the example shown in FIG. 3B, each of variables 1 and 2 have three values that are binned in a normal range of [0,8]. Special values exist for each value outside of this range. For any vector x, the vector x has n training samples $\{x_i, y_i\}^n$, where $x_i \in \mathbb{R}^p$ denotes the input vector, the label $y_i \in \{-1, 1\}$ for classification models, and $y_i \in \mathbb{R}$ for regression models. A logistic regression or linear regression model calculates a linear combination of the input variables according to Equation 3:

$$f(x) = w_0 + \sum_{j=1}^{p} w_j x_j$$

Equation 3

The jth component of the vector (for example, the vector indicated by the equation f(x)) above) is binned and mapped to a corresponding binary vector having length equal to the number of bins for the variable, such that each binary vector has a single non-zero entry such that the non-zero entry exists for the bin in which the jth component belongs, according to the representations below:

$$x_j \rightarrow b_j = (b_{j,1}^s, \ldots, b_{j,r_j}^s, b_{j,1}, \ldots, b_{j,t_j})$$

$$b_{j,k}^s = \begin{cases} 1, \text{ if } x_j \text{ falls into } k^{th} \text{ special bin} \\ 0, \text{ otherwise} \end{cases}$$

$$b_{j,k} = \begin{cases} 1, \text{ if } x_j \text{ falls into } k^{th} \text{ normal bin} \\ 0, \text{ otherwise} \end{cases}$$

Accordingly, for variable 1, three vectors are generated, one for each of the three values of variable 1 shown. Where the normal bins for the variable 1 exist at [0-2], (2-5], and (5-8] with special values at $-1$ and 9, the binary vectors for the variable 1 values of {9,3,7} are {0,1,0,0,0}, {0,0,0,1,0}, and {0,0,0,0,1}, respectively. Similarly, the scorecard model described herein generates three binary vectors for variable 2 shown, according to the equations above. Specifically, for the variable 2 values of {0,−1,2}, the corresponding variable vectors for normal bins at [0], (0-1], (1-4], and (4-8] with a special value bin for −1 are {0,1,0,0,0}, {1,0,0,0,0}, and {0,0,0,1,0}, respectively. Based on these binary vectors, each corresponding feature vector x can be mapped to a large binary vector having dimensions determined by granularity of the bins in the normal range. For example, the binary vector for the sample $x_1$ of FIG. 3B may be ({0,1,0, 0,0}, {0,1,0,0,0}), where the sample $x_1$ has variable 1 and 2 values of {9,0}. Similarly, the binary vector for the sample $x_2$ is ({0,0,0,1,0}, {1,0,0,0,0}).

An output of the scorecard model for the equation f(x) above may be represented by Equation 4:

$$f(x) = w_0 + \sum_{j=1}^{p} \sum_{k=1}^{d_j} w_{j,k} b_{j,k} (x_j \text{ is cut into } d_j \text{ bins})$$ Equation 4

Each of the normal and special bins for the vector f(x) is assigned or associated with a weight or score. The weight vector (or bin scores) for the variable $x_j$ may comprise all weights for all of the bins, normal and special, for that variable. Furthermore, an overall or total weight vector (or bin scores) for all variables may contain the weights of all weight vectors for each variable. In some embodiments, the scorecard models apply monotonicity constraints on the normal bins but not the special bins, where the monotonicity constraints limit to non-increasing or non-decreasing changes in the weights for subsequent bins. For example, the scorecard model described herein may place a non-decreasing monotonicity constraint on the normal bins of the variable 1 (the score/weight of the bin [0-2] is less than or equal to the score/weight of the bin (2-5], which is less than or equal to the score/weight of the bin (5-8]) shown in FIG. 3B and a non-increasing monotonicity constraint on the normal bins of the variable 2 (the score/weight of the bin [0] is greater than or equal to the score/weight of the bin (0-1], which is greater than or equal to the score/weight of the bin (1-4], which is greater than or equal to the score/weight of the bin (4-8].

The scorecard model can implement scoring for each variable of the function f(x) according to the equation f(x) above. For example, in the representation of FIG. 3B, the x1 comprises the values {9,0}, x2 comprises the values {3,−1}, and x3 comprises the values {7,2}. Thus, the score for x1 may comprise the weight $w_0$ plus the weight for the special bin in which the value 9 falls plus the weight for the normal bin in which the value 0 falls. Similarly, the score for x2 is equal to the weight $w_0$ plus the weight for the normal bin in which the value 3 falls plus the weight for the special bin in which the value −1 falls, and the score for x3 is equal to the weight $w_0$ plus the weight for the normal value 7 plus the weight for the normal value 2. $w_0$ may represent a bias term in Equation 4. The bias term may provide the default score value when the score/weight of all the bins for all the variables is set to zero. Thus, for each value $x_j$ of the function f(x), the scoring function $S(x;w,w_0)$ can be generated as the sum of the weight $w_0$ and each score/weight of the normal and special bins for each variable $x_j$ of the function f(x). This scoring function can be compacted down to Equation 5:

$$S(x;w,w_0) = w_0 + w^T b$$ Equation 5

Where the total score effectively becomes an initial score/ weight plus the inner product of the score/weight vector and the binary bin vectors. However, calculating the inner product of the score/weight and binary bin vectors can be computationally expensive. Accordingly, since b is binary and sparse, the scorecard model can add up selected elements in w without explicitly calculating an inner product of $w^T b$.

The scores/weights of the bins can be optimized to minimize a logistic loss subject to one or more sparsity penalties, according to Equation 6 below, which represents the training equation of the scorecard model disclosed herein:

$$\min_w \frac{1}{n} \sum_{i=1}^{n} \log(1 + \exp(-y_i, S(x_i; w, w_0))) + R(w)$$ Equation 6

$$\text{s.t.} \quad Gw \le h$$

Where w denotes the weights assigned to the bins and the bias term. The scorecard model learns bin weights by solving an optimization problem with a monotonicity and other constraints. The logistic loss of this equation can be replaced with hinge loss or other loss functions. Additionally, as shown in Equation 6, regularization can be added to as appropriate. The constraint matrix G is block diagonal and sparse in general. h may comprise a vector. The formula G w≤h in Equation 6 may represent the general form of the inequality constraint in the optimization problem in Equation 6. The actual form and element values of G and h may depend on the specific constraint required by the user. For example, to represent the monotonicity constraint, G is block diagonal and sparse and h equals the zero vector (i.e., a vector with all elements equal zero). $G_1 w_1 \le 0$ may describe the monotonicity constraint for the weights/scores for variable 1 in FIG. 3B. FIG. 3B illustrates an example where the variable 1 has a non-decreasing constraint on the normal bin weights $w_{1,1} \le w_{1,2} \le w_{1,3}$ while there may be no constraint on the special values. Hence, the formula $G_1 w_1 \le 0$ may be a compact matrix representation of such a relationship among the five bin weights of variable 1. The formula $G_2 w_2 \le 0$ may be analogous for variable 2 but being a non-increasing constraint.

Monotonicity Constraints

Monotonicity constraints, as applied by the scorecard models herein, can apply to bin weights used by the scorecard models. For example, the scorecard model applied to the variable 1 in the FIG. 3B cuts the variable $x_1$ into the bins [0-2], (2-5], and (5-8] with special value bins at −1 and 9. $w_{1,1}$ represents the weight of the bin [0-2], $w_{1,2}$ represents the weight of the bin (2,5], $w_{1,3}$ represents the weight of the bin (5-8]. The monotonicity constraint may set $w_{1,1} \geq w_{1,2} \geq w_{1,3}$. Thus, where the variable $x_1$ records number of delinquencies for an individual in a period of the previous 12 months, the non-increasing monotonicity constraints ensure that the scorecard model applied to the variable $x_1$ will provide a lower credit score (or higher risk assessment score) to those individuals having larger numbers of delinquencies. More explicitly, as the number of delinquencies increases, the individual moves into bins having lower weights or score values associated therewith.

Monotonicity constraints provide explainability to the associated scorecard models. For example, the simple relationships associated with the monotonicity constraints are generally simple to explain. For example, in the delinquencies example above, a resulting low credit score or high risk score generated by the scorecard model using the monotonicity constraints can be easily explained to the corresponding individual, for example, high numbers of delinquencies cause low credit scores or high risk assessments, so improvement of the credit scores will come with reduced delinquencies. Thus, monotonicity constraints applied in the scorecard models improve readability and understandability of the scorecard models.

Additionally, scorecard models employing monotonicity constraints also introduce or represent a sense of fairness in the models because such constraints operate as rules that apply to all records to which the scorecard models are applied. For example, in the delinquencies example above, the monotonicity constraints ensure, for otherwise identical individuals, that individuals with fewer delinquencies (and, presumably, with better credit histories) will always receive a higher credit score (or lower risk assessment scores) as compared to those individuals with more delinquencies (and, presumably, with worse credit histories). This, in turn, helps usage of such scorecard (and similar) models to be accepted by the public. Accordingly, learning of model parameters can be formulated as a constrained optimization problem using a sequence of inequality constraints, where $-w_{1,1}+w_{1,2} \leq 0$, $-w_{1,2}+w_{1,3} \leq 0$, and so forth, for example with the monotonicity constraints of the weights described above.

The monotonicity constraints introduced above are applied to normal bins, or the bins that fall within the minimum and maximum valued range. For example, the user (for example, a modeler or data scientist) has the flexibility to decide whether to apply the same monotonicity constraints to the special bins for variable values that fall outside the range. In the delinquencies example above, individuals with fewer numbers of delinquencies have a higher score or weight based on the bin into which they fall having a higher weight than bins for larger numbers of delinquencies. However, an individual with no credit history may be assigned a special value of −1 because the lack of any credit history is different than a credit history with zero delinquencies and may be treated as a special case. Similarly, if x records the overall utilization of an individual's credit cards (i.e., the total balances divided by the total credit limits), x should have a valid value range [0%, 100%] (assuming that the individual cannot spend over their credit limit). A corresponding scorecard model may apply a decreasing monotonicity constraint to x so that individuals with higher utilization will receive a lower credit score or higher risk assessment. However, an individual with no credit cards will receive a special value, for example 999%. Determining whether the special values are to be associated with a good, or high weight or score, or a bad, or low weight or score, may be difficult. For example, no credit cards can be good in either case: no delinquencies or no debt can be highly regarded. However, the reasons for the lack of credit could be bad, for example all applications were denied for other reasons, which would be negatively weighted. In such cases, the scorecard models can decide weights for the special values based on the knowledge or information contained and embedded in input data set and provide the scorecard models flexibility in choosing the best weight to minimize classification error.

More specifically, the scorecard models described herein employ a binning process that cuts variable x values into the normal bins and the special bins. As introduced above, the normal bins are the bins that fall within the valid value range of the variable x, as specified by the defined minimum value and the defined maximum value. These bounds are defined according to the nature of the variable x or domain knowledge. The scorecard models apply the monotonicity constraints described above to these normal bins. The special bins are the bins for variable values or values that fall outside of the valid value range for the variable and are considered special values. Each special bin is a singleton consisting of one unique special value or multiple special values can be mapped into the same special value bin.

As introduced above, for the jth variable of x, the number of normal bins is denoted as $t_j$ the number of special bins is denoted as $s_j$, and the total number of bins is denoted as $d_j = s_j + t_j$. The total number of bins for all variables of x may be represented by Equation 7:

$$d = \sum_{j=1}^{p} d_j \qquad \text{Equation 7}$$

The binning process of the scorecard model may induce a mapping on a training sample of Equation 8:

$$x \in \mathbb{R}^p \overset{\phi}{\to} b \in \mathbb{R}^d \qquad \text{Equation 8}$$

The weight vector for the scorecard model may be defined by Equation 9:

$$w = \begin{pmatrix} w_1 \\ \vdots \\ w_p \end{pmatrix} \in \mathbb{R}^d \qquad \text{Equation 9}$$

Where:

$$w_j = \left( w_{j,1}^S, \ldots, w_{j,s}^S, w_{j,1}, \ldots, w_{j,t_j} \right)^T \in \mathbb{R}^{d_j} \qquad \text{Equation 9.1}$$

Where:

$$\{w_{j,k}^s\}_{k'=1}^{s_j} \text{ and } \{w_{j,k}\}_{k=1}^{t_j} \qquad \text{Equation 9.2}$$

denote the weights on the special bins and the normal bins for the jth variable. In some embodiments, the weights of the special bins precede the weights of the normal bins in each $w_j$, or vice versa. Additionally, the location of the bin intervals may be sorted among special and normal bins, respectively, in an ascending or descending order (ascending as described herein). As introduced above, FIG. 3B provides an illustration of such variable binning.

As introduced above, the non-increasing or non-decreasing monotonicity constraints are only imposed on a variable's normal range. A matrix form of the non-decreasing monotonicity constraint can be written as a block-diagonal matrix of Equation 10:

$$\begin{pmatrix} G_{mono}^1 & & \\ & \ddots & \\ & & G_{mono}^p \end{pmatrix} w \le 0 \qquad \text{Equation 10}$$

Where:

$$G_{mono}^j = \begin{pmatrix} \underbrace{0 \ \dots \ 0}_{s_j} & 1 & -1 & & \\ & & 1 & -1 & \\ & & & \ddots & \ddots \\ & & & & 1 & -1 \end{pmatrix} \in \mathbb{R}^{(t_j-1) \times d_j} \qquad \text{Equation 10.1}$$

For each j=1, . . . , p. If the jth variable is free of monotonicity constraints, then $G_{mono}^j$ is not calculated by the scorecard model and skipped.

In some embodiments, whether or not to apply monotonicity constraints (for example to one or more of the normal bins and corresponding values and/or the special bins or values) is selected by the user who makes the request. For example, the user may select to turn on monotonic constraints or identify the bins to which the monotonic constraints apply.

Bin Protection

The scorecard models described herein may further implement bin protection to improve simplicity and interpretability of the scorecard model. For example, the scorecard model imposes some level of additional constraints (additional to the monotonicity constraints and corresponding constraints described above) for certain special values. For example, suppose the variable x records an individual's education level, where the bin 1 denotes elementary school level education, the bin 2 denotes middle school level education, up until the bin 7 denotes doctoral level education. The variable x may have a special value 99 that indicates lack of information regarding this individual's education information. Where higher binned individuals receive higher scores for education, the scorecard model should not provide an individual with special value 99 a higher score than individuals with doctoral degrees (i.e., individuals in the bin 7). Depending on the context, the scorecard model may not assign such individuals higher scores than individuals with college educations. Such constraints can be expressed as a sequence of inequality constraints (similar to the monotonicity constraints introduced above), with the weight of the special bins being smaller than or equal to the weights of bins containing specific normal values. For example, the weight of the special bin 99 may be less than or equal to the weight for each of the bins 7, 6, 5, and 4.

In the credit-based delinquencies examples above, individuals with no credit histories (and, thus, no delinquencies) may be assigned the special value −1. However, the weights for the special value −1 bin may be lower than the bins for those individuals with between 0 and 2 delinquencies. The scorecard model may assign any other combination of normal bins to have higher weights than the special value bin.

Figure 4A:
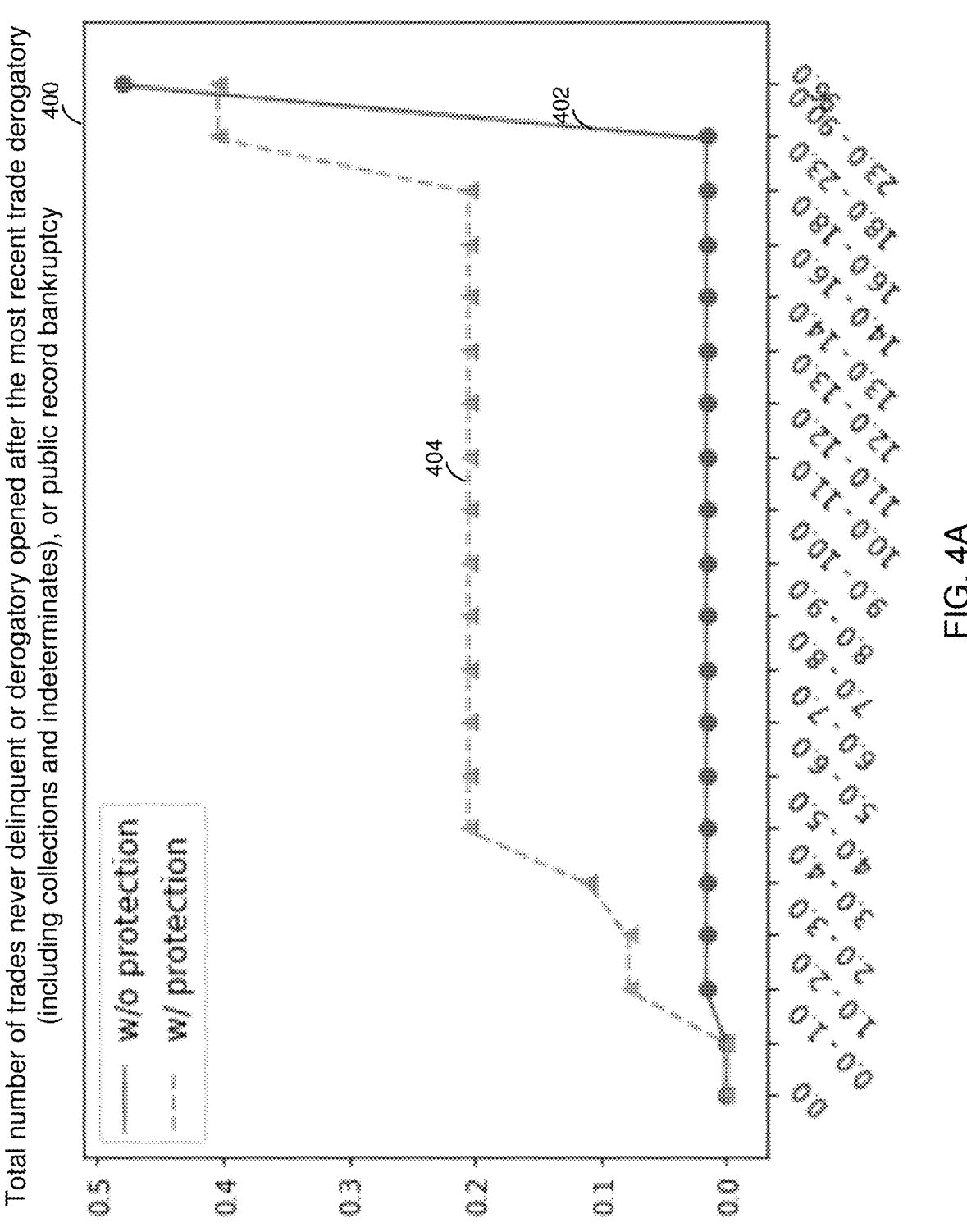
FIGS. 4A and 4B provide visual representations of a bin protection constraint on the weights of special values within a range of weights of normal bins, according to some embodiments of the scorecard model described herein.
Figure 4B:
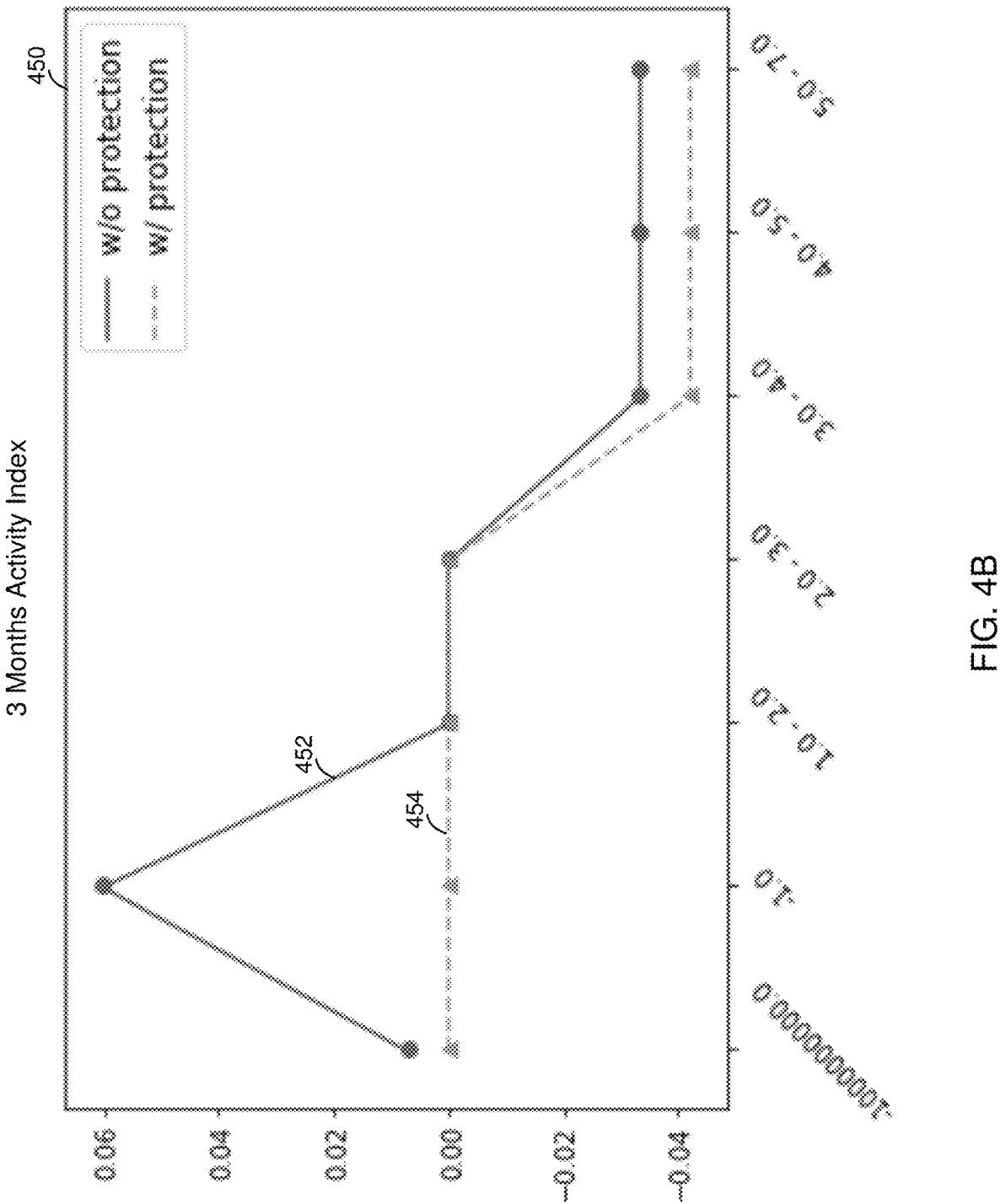

FIGS. 4A and 4B provide visual representations of the bin protection constraint on the weights of the special values within the range of weights of the normal bins according to the scorecard model described herein in some embodiments. Line 402 of FIG. 4A represents weights of the normal and special bins without the bin protection described herein while the line 404 represents the weights of the normal and special bins with the bin protection. The graph 400 shows different bin groupings along the x-axis and corresponding weights or scores along the y-axis. As shown in the graph 400, the normal bins range may exist between 0 and 90 and special value exists at 96. The weights without bin protection, represented by line 402, shows that the weight of the special value bin 96 increases to between 0.4 and 0.5, while the maximum weight of the normal bins 0-90 has a maximum value of 0.4. The bin protection indicated by line 404 shows that the maximum weight of the special value bin 96 is substantially equal to the maximum weight at the normal bin 23-90. Similarly, line 452 of FIG. 4B represents weights of the normal and special bins without the bin protection described herein while the line 454 represents the weights of the normal and special bins with the bin protection. The graph 450 shows different bin groupings along the x-axis and corresponding weights or scores along the y-axis. As shown in the graph 450, the normal bins range may exist between 1.0 and 7.0 and special values exist at −10000000000.0 and −1. The line 452 shows that the weight of the special value bin −1.0 increases to substantially 0.06 while the maximum weight of the normal bins 1.0-7.0 has a maximum value of 0.00. The bin protection indicated by line 454 shows that the maximum weight of the special value bin −1.0 is substantially equal to the maximum weight at the normal bins 1.0-2.0 and 2.0-3.0.

In some embodiments, the user can select or determine whether or not to apply bin protection constraints to the application of the ML models to generate the risk assessment. For example, the user may select to turn on or off best bin protection constraints or identify the bins to which scores or weights should be limited.

Zero-Base Constraint

The scorecard models may further set a weight of one or more specific bins to zero to improve robustness, interpretability, readability, and explainability of the scorecard models and improve acceptance of such models by the public. The zero-base constraint may be imposed on either the special or the normal bins to the discretion of the user. For example, when the variable x records or denotes a number of credit inquiries (for example, hard inquiries on an individual's credit), the scorecard model may set a corresponding weight for the normal bin x=0 to zero. Thus, under the zero-base constraint, an individual with no recent credit inquiries will not be penalized by the scorecard model and an individual with inquiries will have the scorecard model reduce their corresponding scores generated by the scorecard model.

When training the scorecard model, this normal bin's weight is set to zero, and the corresponding constraint can be expressed as $w_{j,1}=0$ for training purposes or as Equation 11 below:

$$\begin{pmatrix} A^1 & & \\ & \ddots & \\ & & A^p \end{pmatrix} w = 0 \qquad \text{Equation 11}$$

Where:

$$A^j = \begin{pmatrix} \underbrace{0 \dots 0}_{s_j} & 1 & 0 & \\ & & \ddots & \\ & & & 0 \end{pmatrix} \in \mathbb{R}^{1 \times d_j} \qquad \text{Equation 11.1}$$

for each $j = 1, \dots, p$.

In some embodiments, whether or not to apply zero-base constraints (for example to set a weight of one or more bins to a specific value, such as zero) is selected by the modeler/data scientist who develops the risk assessment model. For example, the modeler/data scientist may select to turn on or off zero-base constraints or identify the bins to which the zero-base constraints apply.

$L_1$ Regularization

Introduction or application of regularization to the scorecard model may further improve robustness, interpretability, readability, and explainability of the scorecard models and improve acceptance of such models by the public. Specifically, the scorecard model can apply $L_1$ regularization to an objective function, according to Equation 12 below:

$$R(w) = \lambda |w|_1 \qquad \text{Equation 12}$$

Where $\lambda$ is a chosen coefficient representing a strength of the regularization. The L1 regularization coefficient $\lambda$ is a hyper-parameter of the scorecard model described herein. This hyper-parameter may be set by the user, for example, via a parameter-tuning method such as grid search. Larger values of lambda may lead to sparser bin weights (for example, where a number of bins have zero weight) and may be better generalized to unseen data, while on the other hand reducing the prediction power of the scorecard model. The L1 regularization coefficient A may be prevalent in machine learning models for solving various credit risk prediction problems. Judicious choice of this parameter can strike a balance between prediction and generalization capability of the scorecard model. The non-smooth $L_1$ norm may create some difficulty for gradient or Newton optimization methods for the scorecard model. The scorecard model can overcome such difficulties by introducing auxiliary variables to the Equation 6 as follows in Equation 13:

$$\min_{w,b} \ \frac{1}{n} \sum_{i=1}^{n} \log(1 + \exp(-y_i, f(b_i; w))) + \lambda 1^T u \qquad \text{Equation 13}$$

$$\text{s.t.} \quad -u \le w \le u$$

Where $u \in \mathbb{R}^d$ denotes a vector of auxiliary variables and $1 \in \mathbb{R}^d$ denotes a vector whose entries are all 1.

In some embodiments, whether or not to apply $L_1$ (or similar) regularization is selected by the user who submits the risk assessment request. For example, the user may select to turn on or off such regularization or what level of regularization to apply (for example, what coefficient to use for the strength of the regularization).

Binarsity Regularization

Binarsity regularization enables the scorecard model to penalize a difference of the weights associated with adjacent normal bins, which can encourage the scorecard model to combine neighboring bins. This can lead to simpler scorecard models that are more easily understood and explained. Similar to the $L_1$ regularization described above, the binarsity regularization may involve replacing the regularization term $R(w)$ in Equation 6 above with Equation 14 below:

$$R(w) = \gamma \sum_{j=1}^{p} \sum_{k=1}^{t_j - 1} |w_{j,k} - w_{j,k+1}| \qquad \text{Equation 14}$$

Where auxiliary variables, Vik are defined such that:

$$-v_{j,k} \le w_{j,k} - w_{j,k+1} \le v_{j,k} \qquad \text{Equation 14.1}$$

Where $v \in \mathbb{R}^{d'}$ denotes a vector containing the auxiliary variables $v_{j,k}$ where:

$$d' = \sum_{j=1}^{p} (t_j - 1) \qquad \text{Equation 14.2}$$

The reformulated optimization equation, based on Equation 6 and similar to Equation 13, is Equation 15:

$$\min_{w,b} \ \frac{1}{n} \sum_{i=1}^{n} \log(1 + \exp(-y_i, f(b_i; w))) + \gamma 1^T v \qquad \text{Equation 15}$$

$$\text{s.t.} \quad -v_{j,k} \le w_{j,k} - w_{j,k+1} \le v_{j,k}, \ \forall_{j,k}$$

As noted with respect to Equation 13, Equation 15 operates as an optimization problem for the scorecard model having inequality constraints exist on the concatenated variables (w,v).

The scorecard model described herein may operate, provide, or support any combination of constraints and regularizations described herein. The specific optimization problem applied to or by the scorecard model described herein can be formulated by introducing one or more auxiliary variables (such as in Equation 13 and Equation 16), concatenating the constraints assembled in Equations 10 and 10.1 and 11 and 11.1, and adjusting the dimension of the matrices and vectors in the constraints to be aligned with the auxiliary variables.

The user may select whether or not to apply binarsity regularization and/or what coefficient of binarsity regularization to apply to the ML models to determine the risk assessment. For example, the user may select to turn on or off such regularization or what level of regularization to apply (for example, what coefficient to use for the strength of the regularization).

Constraints Across Variables

In some embodiments, the scorecard model may apply constraints across multiple variables that the scorecard model is processing, for example, when two variables processed by the scorecard model are related (for example, may be impacted by the same data) or may have overlapping values. For example, for a scorecard model that generates a credit score for a user, the scorecard model may utilize multiple variables related to delinquency of payments. Delinquency may be measured by severity across different but similar time frames, such as a number of 30+ day delinquent payments and a number of 60+ day delinquent payments in the last 12 months. Intuitively, a consumer with two 60+ day delinquent payments in the last 12 months is intrinsically riskier than a consumer with two 30+ day delinquent payments in the last 12 months. Thus, the score-card model may include both variables and demand that the weight of the two 60+ day delinquent payments in the last 12 months be no more than that of the two 30+ day delinquent payments in the last 12 months, and so on, by introducing constraints across these related variables.

The user may select whether or not to apply constraints across variables and/or what constraints and/or variable features to apply.

Optimization-Based Approach

As introduced above, training of scorecard models with various constraints can be formulated into a constrained optimization problem according to Equation 16:

$$\min_{w} \frac{1}{n}\sum_{i=1}^{n}\log(1 + \exp(-y_i, f(b_i; w))) + R(w) \qquad \text{Equation 16}$$

$$\text{s.t.} \quad Gw \leq h$$

$$Aw = z$$

U-Shaped Constraints

Like the monotonicity constraint, U-shaped constraints is another specific form of constraint in the general problem formulation in Equation 6. The scorecard model described herein has the flexibility to support both types of constraints. For example, the user may require the monotonicity con-straint on one variable while requiring the U-shaped con-straint on another variable. In some embodiments, the score-card model may split a variable into multiple "virtual" values. For example, if a particular variable is expected to have a nonmonotonic relationship with target variable that fall within a bell-shaped or U-shaped curve, the scorecard model may split the variable into two virtual or sub variables to analyze them separately. For example, when analyzing a credit score as the risk assessment, a number of credit accounts may be expected to be between 5 and 15 total accounts for an adult 30 years of age, where fewer than 5 accounts and more than 15 accounts may be viewed as potentially concerning with respect to the individual's credit score. As opposed to processing this variable singularly, the scorecard model may split the variable into two sub-vari-ables at, for example, 9 (which may be the point in the bell-shaped or U-shaped curve changes directions. By split-ting the variable into two sub-variables, the scorecard model may maintain monotonic constraints for each of the sub-variables that may otherwise conflict with the monotonicity constraints described herein.

Training Scorecard Models

Traditional Training

Training of traditional scorecard models may involve creating monotonic binning on the variable x's normal value range. The scorecard model may initially create many small normal bins on the variable x and then combine neighboring normal bins so that the bad rates or weight-of-evidence of the resulting normal bins follow a required monotonicity constraint. The scorecard model may form special bins for each of the special values. Once the normal and special bins are formed, the scorecard model may calculate the WOE for each of the formed bins and represent the variable x with the WOE. The scorecard model may then train a logistic regres-sion model with nonnegative weights based on the WOE representation such that the weight assigned to a particular bin equals the logistic regression weight of the variable times the WOE of the particular bin. The corresponding trained scorecard model may satisfy the monotonicity con-straints but may not easily impose zero-base, protected bin, cross variable constraint, and binarsity regularization con-straints. For a modeling problem with n input variables, the dimensionality of the search space of traditional score card mode is n, while the dimensionality of the search space of optimization based score card is d, as defined before, much higher than n, which, when combined with proper con-straints and penalty terms, often produce more explainable model with stronger model performance on hold out set, especially when the data set is noisy or has limited number of samples.

Where a specific form of G, A, h and z are provided above.

Contrary to the traditional training approach, the optimi-zation-based approach employs a custom and specific spe-cial data structure that exploits sparsity of the mapping $\phi$ in Equation 8 above and creates a proper index for the sample variables and the bins. The mapping $\phi$ inevitably increases the dimension of the bin weights w for the variable x, especially when a large number of variables are used to train the scorecard model and the resulting binning is dense for the variables. Consequently, the optimization problem rep-resented by Equation 16 can be challenging to solve due to intensive matrix and vector products involved when com-puting a gradient and a Hessian of the corresponding objec-tive function. By using the special data structure, direct multiplication between matrices and vectors is avoided. Furthermore, the binning process for the scorecard model training, under the optimization-based approach, does not require the WOE of the bins to follow any monotonic trend. Once the binning process is completed, the scorecard model assembles and stores the following:

A matrix, $X_w$, of dimension n×p, where an element $X_w[i, j] \in \{1, 2, \ldots, d\}$ represents an index of the bin that the jth sample belongs to with respect to the jth variable. $X_w$ may be useful for computing the inner product $w^T w_j$ whereby the weight of the bins containing $x_i$ is easily retrieved.

A vector, $X_y$, of dimension np. The vector $X_y$ may comprise a concatenation of d segments each contain-ing indices of a sample belonging to each bin. The dimension of $X_y$ equals np since each sample is assigned to exactly p bins, each corresponding to one variable.

A vector, $X_{pos}$, of dimension d. An element, $X_{pos}[k]$, may represent the position in $X_y$ where the segment for the kth bin starts. $X_{pos}$ may be useful for retrieving the sample indices in the kth bin.

A vector, $X_{len}$, has a dimension d. An element, $X_{len}[k]$ equals a number of samples in the kth bin. $X_{len}$ may be useful for iterating through all the segments in Xy since the length of each segment can vary.

Figure 5:
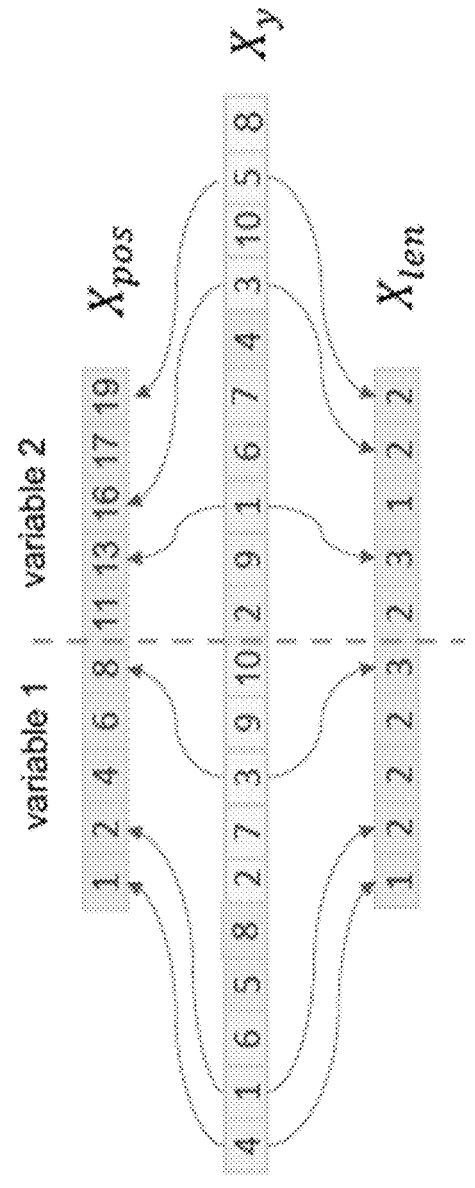
FIG. 5 provides an illustration of a special data structure based on the example information provided in FIGS. 3A and 3B with two variables and ten bins in total.
Figure 5:
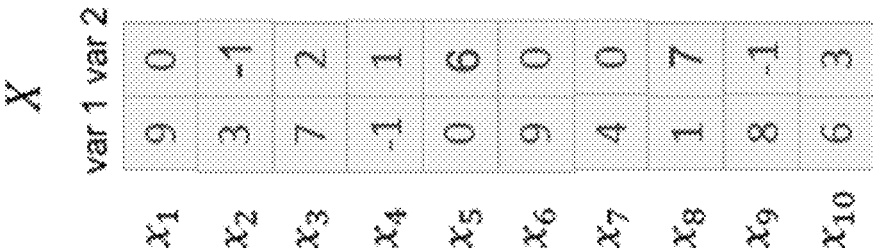

A representation of the matrices and vectors assembled by the scorecard model in the optimization-based training approach, and the corresponding special data structure, is provided in FIG. 5. More specifically, FIG. 5 provides an illustration of the special data structure based on the example information provided in FIGS. 3A and 3B with 2 variables and 10 bins in total. More samples are included to illustrate the data structure. The element $X_w[i, j]$ represents the index of the bin that the ith sample belongs to with respect to the jth variable. $X_y$ is shown as concatenating 10 segments (depicted in different colors), each concatenated segment containing indices of samples in that bin. The 10-dimensional vectors $X_{pos}$ and $X_{len}$ specify starting posi-tions and the number of samples of each segment.

The scorecard model can efficiently solve the optimization problem of Equation 16 above by utilizing this data structure of FIG. 5, where the object function without the regularization term is defined by Equation 17 below:

$$I(w, b) = \frac{1}{n}\sum_{i=1}^{n}\log\left(1 + \exp\left(-y_i\left(w^T\phi(x_i) + b\right)\right)\right)$$

Equation 17

The scorecard model training may achieve a reduction in computational complexity for evaluating several terms in the objective function and its gradient and Hessian, as described in further detail below.

The scorecard model described herein may evaluate Equation 17 by computing the inner product $w^T\phi(x_i)$ by directly multiplying the d—dimensional vectors, which involves O(d) multiplications and O(d) additions. In the scorecard model implementation described herein, the inner product is simply computed according to Equation 18 below:

$$w^T\phi(x_i) = \sum_{j=1}^{p}w[X_w[i, j]]$$

Equation 18

Where the inner product is represented by the summation of p weights associated with the bins that $x_i$ belongs to with respect to each variable. Thus, only O(p) additions are involved. Hence, the optimization-based training approach reduces from O(nd) multiplications and additions to only O(np) additions, which is a substantial reduction of computational resource demand.

The scorecard model described herein may evaluate the gradient of the Equation 17. The gradient of I(w,b) of Equation 17 with respect to w is expressed in a compact form of:

$$g_w = \frac{1}{n}X\alpha$$

Where X=$(\phi(x_1) \ldots \phi(x_n))\in \mathbb{R}^{d,n}$, $\alpha\in \mathbb{R}^n$ whose ith element $\alpha_i$=yi($\sigma(s_i)$−1), where $s_i$=$y_i(w^T\phi(x_i)$+b)) and $\sigma(s)$=1/(1+exp (−s)). Computation of the inner product in $s_i$ follows the same Equation 18. Apart from computing $\alpha_i$ for each i=1, . . . , n, direct computation of $g_w$ via a matrix-vector product involves O(nd) multiplications and O(nd) additions.

On the other hand, a component-wise formula of the gradient of the I(w,b) of Equation 17 is provided by Equation 19 below:

$$g_w[k] = \frac{1}{n}\sum_{i=1}^{n}\alpha_i\phi(x_i)[k]$$

Equation 19 for k=1, . . . , d. Since $\phi(x_i)[k]$ indicates if the sample $x_i$ belongs to the kth bin, the sum in Equation 19 may be obtained by collecting the samples in the kth bin and summing up the corresponding values in $\alpha$. Example pseudo-code for computing the gradient of I(w,b) using $X_y$, $X_{pos}$, and $X_{len}$ is shown in Algorithm 1:

Data: $X_y$, $X_{pos}$, $X_{len}$
Result: gradient vector $g_w$
initialize $g_w$;

calculate $\alpha$=$(\alpha_1, \ldots, \alpha_n)$;
for k=1, 2, . . . , d do
    s=0;
    ptr=$X_{pos}$[k];
    for I=1, 2, . . . , $X_{len}$[k] do
        sum+=$\alpha$[$X_y$[ptr]];
    end $$g_w[k] = \frac{s}{n};$$

end

Algorithm 1

Such a computation performs only O(np) additions. The gradient with respect to b involves only scalar operations.

The scorecard model may evaluate a Hessian matric of I(w,b). The Hessian matrix with respect to w can be expressed in a compact form:

$$H_w = \frac{1}{n}X\Lambda X^T$$

Where X=$(\phi(x_1) \ldots \phi(x_n))\in \mathbb{R}^{d,n}$, $\Lambda$=diag$(\beta_1, \ldots, \beta_n)$ is an n-dimensional diagonal matrix, and $\beta_i$=$y^2_i\sigma(s_i)(1-\sigma(s_i))$ for i=1, 2, . . . , n. Direct calculation with these matrices can be intractable when the dataset is large or the variable binning is dense. Apart from computing $\beta_i$ for each i=1, . . . , n, direct computation of $H_w$ via matrix product involves O(nd$^2$) multiplications and O(nd$^2$) additions.

Furthermore, a component-wise formula of the Hessian is given by Equation 20 below:

$$H_w[k, m] = \frac{1}{n}\sum_{i=1}^{n}\beta_i\phi(x_i)[k]\phi(x_i)[m]$$

Equation 20

For k=1, . . . , d and 1≤m≤k, and $H_w$[m,k]=$H_w$[k,m] due to symmetry of the Hessian. Since $\phi(x_i)[k]$ and $\phi(x_i)[m]$ indicate if the sample $x_i$ belongs to the kth bin and the mth bin respectively, the scorecard model may obtain a sum in Equation 20 by collecting the samples that belong to both the kth bin and the mth bin, and then sum up the corresponding $\beta$ values. The computation utilizes the pre-stored data $X_y$, $X_{pos}$, and $X_{len}$ in a similar way as for computing the gradient, albeit in a nested loop. Only O(npd) additions are executed.

Figure 6:
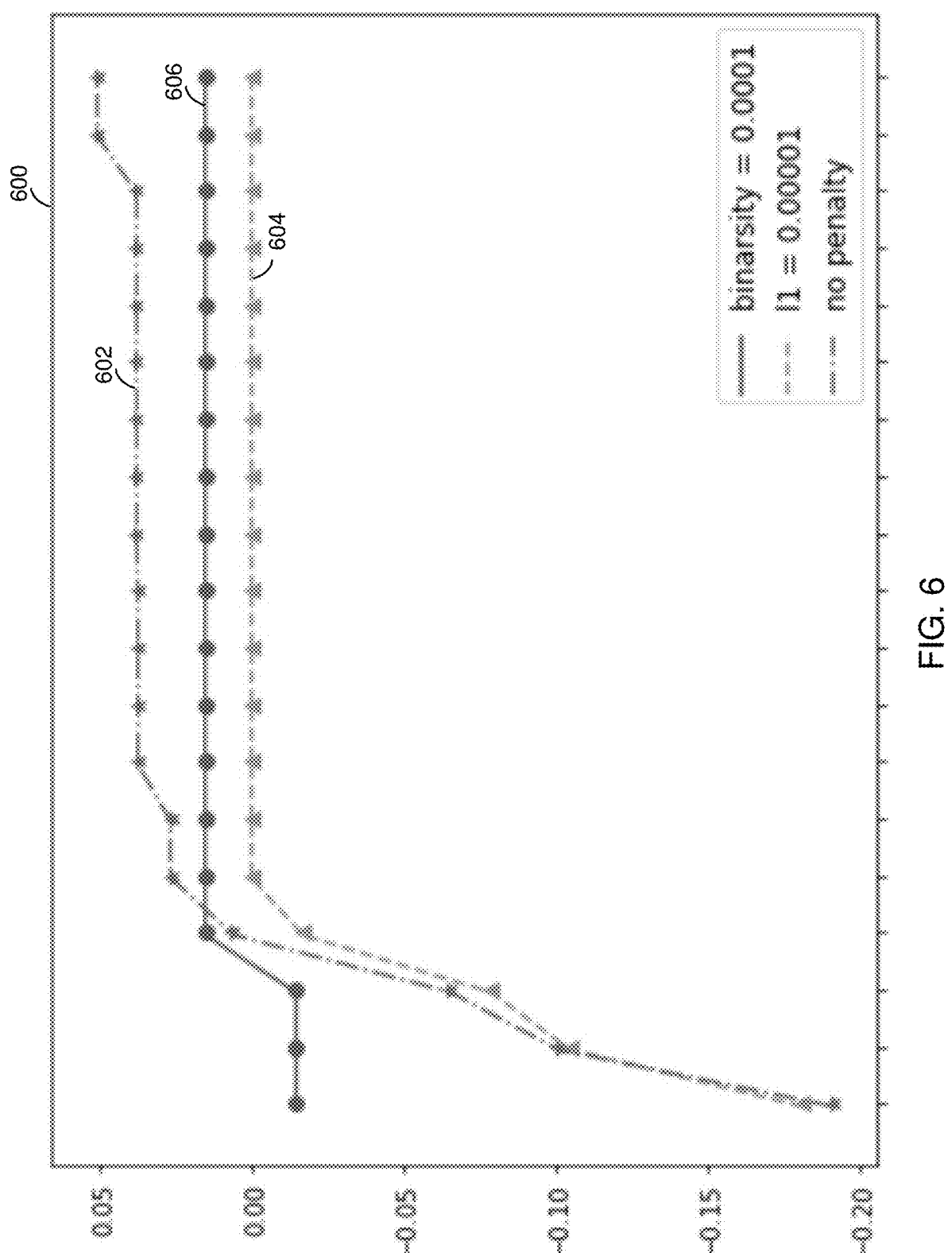
FIG. 6 shows a graph comparison of a binarsity regularization or penalty, $L_1$ regularization or penalty, and no penalty, and their impacts to model complexity as reflected by number of final bins.

FIG. 6 shows a graph comparison of the binarsity regularization or penalty, $L_1$ regularization or penalty, and no penalty applied to the optimization of the training of the scorecard model. The graph includes a line 602 for the "no penalty" optimization, a line 604 for the $L_1$ regularization or penalty, and a line 606 for the binarsity regularization or penalty. The graph 600 shows input variable bins along the x-axis and score weights along the y-axis. The samples in the dataset to which the scorecard model is applied could be weighted. If so, the samples weights are incorporated in the calculation of the objective function of the dataset as well as the gradient and Hessian for the dataset. The objective function may depend both on the data and the model. The mathematical expression of the objective function, together with its gradient and Hessian, may depend on the specific structure of the model (for example, the scorecard). The dataset may then be used to evaluate these functions. An illustration of typical bin weights trained with the binarsity and $L_1$ regularization or penalty is plotted in FIG. 6. As shown in FIG. 6, the binarsity regularization or penalty of line 606 more effectively reduces the difference of weights between adjacent bins as compared to the $L_1$ regularization or penalty. Binarsity regularization reduces the variable to two bins, $L_1$ regularization reduces the variable to 5 bins. The reduction of complexity of the scorecard model can be measured by merging adjacent normal bins where the difference in weights of the adjacent normal bins is below 0.0001.

As shown in FIG. 6, the binarsity penalty yields fewer bins after bin merge as compared to the $L_1$ penalty. Moreover, the binarsity penalty also exhibits a trade-off between the model reduction and performance.

Gradient Boosted Decision Tree Training

Figure 7:
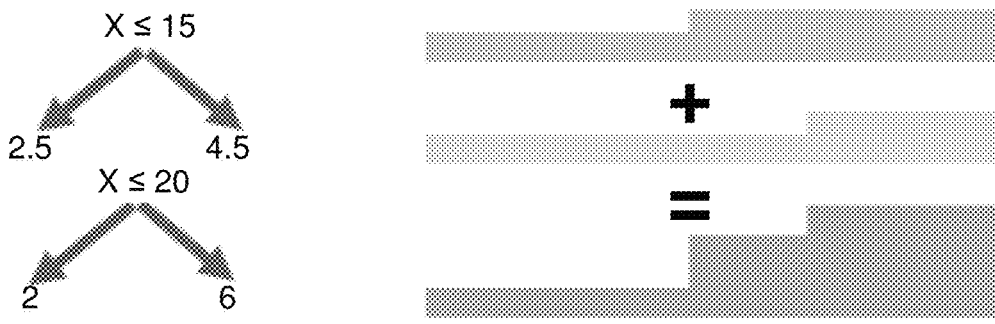
FIG. 7 shows a representation of a Gradient Boosted Decision Tree (GBDT) model with stumps that produces the trained scorecard model described herein, according to some embodiments.

FIG. 7 shows a representation of a Gradient Boosted Decision Tree (GBDT) model with stumps that produces the trained scorecard model described herein. The GBDT model to generate or building the scorecard model is a novel approach that builds the scorecard model by training a GBDT model with stumps (i.e., one-split tree with only two leaf nodes). Generally, and as is illustrated in FIG. 7, a variable x has a valid value range [0, 100]. FIG. 7 includes two trees that create two functions of Equations 21 and 22 below:

$$f_1(x) = \begin{cases} 2.5, & \text{if } x \in [0, 15] \\ 4.5, & \text{if } x \in (15, 100] \end{cases} \qquad \text{Equation 21}$$

$$f_2(x) = \begin{cases} 2, & \text{if } x \in [0, 20] \\ 6, & \text{if } x \in (20, 100] \end{cases} \qquad \text{Equation 22}$$

Which, added together, provides Equation 23:

$$f(x) = \begin{cases} 4.5, & \text{if } x \in [0, 15] \\ 6.5, & \text{if } x \in (15, 20] \\ 10.5, & \text{if } x \in (20, 100] \end{cases} \qquad \text{Equation 23}$$

Accordingly, all trees in the GBDT model that use x as the splitting variable will add together into one scorecard based on the value of x. Correspondingly, all the trees using variable y or z will form scorecards based on variable y and z, respectively. Furthermore, if each stump satisfies the monotonicity constraint, the resulting scorecard model also satisfies the constraints. Hence, the scorecard model described herein can be built by training the GBDT model with stumps and enforcing monotonicity constraints on the stumps. The monotonicity constraints can be enforced in the stumps based on ignoring candidate splits on which the monotonicity constraint is violated.

For special values, for which the scorecard model may have flexibility in choosing the best weights, the variable x may have two special values, 999 and 9999. Enforcing increasing monotonicity on x as shown in FIG. 7 and as described above with respect to the normal bins, the special value x=9999 will always have a weight higher than the weight assigned to x=100, and x=999 will always have a weight in between, which can be problematic. Weight assignment for a special value may be arbitrary. It may not be appropriate to compare the weight of a special value to the weight of a normal value. Furthermore, it may not be appropriate to compare weights of different special values, because the special values may bear special meanings such as 'missing information' that cannot be rank ordered. Hence, imposing monotonicity constraints between special and normal values or among the special values may be problematic. Algorithm 2 below may help the GBDT model and the scorecard model avoid this problem.

Data: variable x with valid value [$\min_x$, $\max_x$] and special values $s_1$, $s_2$, . . . , $s_m$. Assume we impose increasing monotonicity on x without loss of generality.

Result: the best split on variable x

Get the best split when viewing x∈[$\min_x$, $\max_x$] as another special value x=$s_{m+1}$, (see on how to get the best split on categorical values);

for each possible split on the valid value range do view [$\min_x$, split_value] and [split_value, $\max_x$] as two special values $s_{m+1}$, $s_{m+2}$;

for each candidate split on the m+2 categorical values do if $s_{m+1}$ and $s_{m+2}$ get weights satisfying the monotonicity constraint then record the split quality;

else ignore this split;

end end end return the best split found above.

Algorithm 2

Figure 9A:
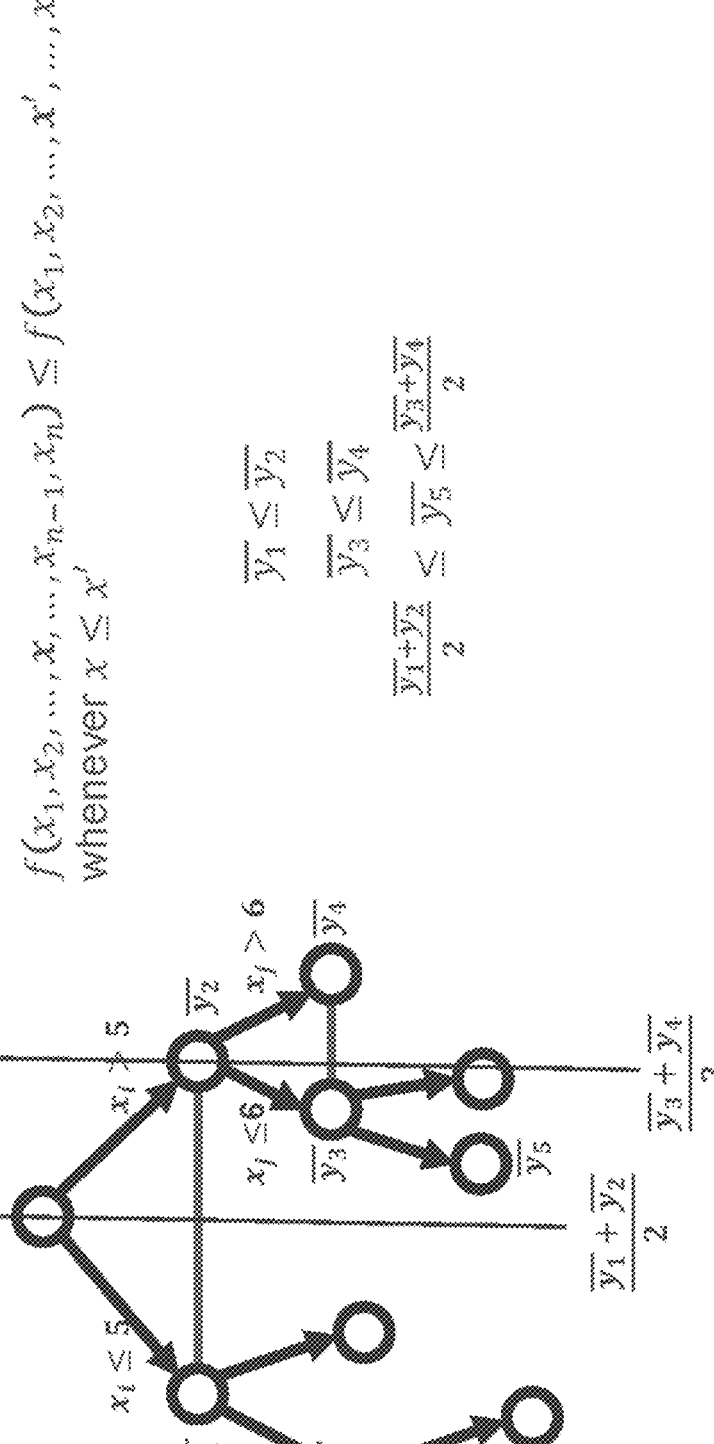

In some embodiments, when multiple special values exist, the EGBDT (Experian Gradient Boosting Decision Trees) model described herein treats the multiple special values as a categorical variable and enables the special values "inside" the categorical variable to be placed on either the left or right side of the split point, enhancing flexibilities to optimize model performance. In some instances, placement of the special values is determined by the node split mechanism that maximizes error reduction. Unlike many traditional GBDT models, the EGBDT model herein may not impose additional constraints regarding the placement of the special values. Such EGBDT models provide more flexibility and improved performance over existing Gradient Boosted models. For example, the optimized approach implemented by the EGBDT models herein achieve monotonicity with fewer trees as compared to previous Gradient Boosted models, therefore improving resource consumption. Additionally, the EGBDT models herein relieve over-constraints and provide target-value re-optimization. For example, typical monotonicity constraints (XGBoost and LightGBM) may use an inherited approach. Such an approach may pass inherited limits to child nodes during tree induction. However, unnecessary constraints can be introduced during the inheriting process. The systems and methods described herein relative to the EGBDT model may identify these unnecessary constraints, remove them, and re-calculate the target values without these constraints, which may lead to a large search space during the optimization and better performance. FIGS. 9A (based on the traditional GBDT model) and 9B (based on the EGBDT model herein) below may provide a comparison of this.

The EGBDT model herein may handle both normal values (values that fall within the valid range of the variable) and special values (values that fall outside the valid range) as categorical values. The EGBDT model may cut the valid values into two or more valid categorical buckets, for example [$v_{min}$, $v_{split}$], ($v_{split}$, $v_{max}$], $s_1$, $s_2$, $s_3$, $s_4$ or put the valid values into a single categorical bucket [$v_{min}$, $v_{max}$], $s_1$, $s_2$, $s_3$, $s_4$, as shown in FIG. 12.

FIG. 12 shows another option in EGDBT for handling special values as categorical variables. For example, the variable to be split has a valid value range [$v_{min}$, $v_{max}$]. The variable can also take special values $s_1$, $s_2$, $s_3$, $s_4$ that are outside the valid value range [$v_{min}$, $v_{max}$]. In some embodiments, when the modelers turn this option on, EGDBT will treat this variable as a categorical variable with the following possible values:

[$v_{min}$, $v_{max}$], $s_1$, $s_2$, $s_3$, $s_4$, or

[$v_{min}$, $v_{split}$], ($v_{split}$, $v_{max}$], $s_1$, $s_2$, $s_3$, $s_4$ for any $v_{min} \leq v_{split} \leq v_{max}$.

Then the algorithm, in some embodiments, will evaluate any combinations of these categorical values to get the best split. The only constraint, in some embodiments, is that [vmin,vsplit] on the left node and (vsplit,vmax] on the right node (assuming increasing monotonicity). The steps shown in FIG. 12, among others described herein, provide more flexibility when comparing with statistical imputation handling of special values.

The EGBDT model may create a tree representing each split or cut in the normal value range. Traditional GBDT model maintains monotonicity by applying heuristics when creating each split, then the monotonicity is preserved for the entirety of the tree. Furthermore, the traditional GBDT model passes inherited limitations or constraints down the nodes in the tree, such that child nodes inherit the limits, etc., of its parent node. FIG. 9A shows how monotonicity constraints may be handled by the traditional GBDT model.

Specifically, FIG. 9A provides an example of monotonicity constraints as applied by the traditional GBDT. As shown, when increasing monotonicity constraints are desired on all the variables, after the root node split $y_1 \leq y_2$. In some instances, the traditional GBDT method will create a virtual rack with value ($y_1 + y_2$)/2 between the left subtree and the right subtree and require all the nodes In the left subtree to values smaller than or equal to the virtual rack, while all the nodes in the right subtree have values bigger than or equal to the virtual rack. Similarly, after split the node $y_2$, $y_3 \leq y_4$ and another virtual rack ($y_3 + y_4$)/2 is created. Now, when splitting the node $y_3$, ($y_1 + y_2$)/2 $\leq y_5 \leq$ ($y_3 + y_4$)/2. When the tree gets deeper and deeper, the nodes will be operating in a narrower and narrower value range.

Furthermore, the EGBDT model may allow target values of new child nodes (or leaf nodes) as well as existing leaf nodes to optimize. A state-of-the-art decision tree method may be fundamentally greedy in nature. For example, each split in the tree, as well as the target value, may be determined in isolation without considering that selection's overall impact. In the methods and systems described herein, after the tree structure is formed, calculations of target values are casted into an optimization problem. This may elevate limitations from the greedy approach, as all the target values are involved when searching for the optimal values. This may capture the underlying characteristics of the dataset and lead to better performance. If the tree generated by the EGBDT model also minimizes square squared errors, the optimization can be handled as a constrained optimization problem according to Equation 24, as shown in FIG. 9B.

$$\text{minimize} \sum\nolimits_{j=1}^{k} \sum\nolimits_{sample\ i\ under\ node\ j} \left( y^j - \bar{y_j} \right)^2, \qquad \text{Equation 24}$$

$$\text{subject to } \bar{y_1} \leq \bar{y_2}, \bar{y_2} \leq \bar{y_3},$$

Equation 24

FIG. 9B is an example of monotonicity constraints as applied by the EGBDT approach described herein. The virtual rack created by the traditional GBDT is unnecessary in some such embodiments. The monotonicity constraints may be imposed as a series of inequality constraints on the node values and a global constrained optimization may be performed on all the nodes in one tree.

The EGBDT model may provide an optimized approach to achieving monotonicity by allowing the target values of two leaf nodes as well as the existing leaf nodes to optimize. Further, where nodes inherit constraints downstream, certain nodes can be over constrained. For example, when a range is split at node y0, by cutting on x1, into leaf nodes node1 and node2, $y1 \leq y2$. When node 1 is split into leaf nodes node3 and node4, and node 2 is split into leaf nodes node 5 and node6, $y3 \leq y4$, y5, and y6, $y4 \leq y5$ and y6, and $y5 \leq y6$. However, y4 may be over constrained because $y4 \leq y5$ is not required for monotone classification. The EGBDT model herein provides for relaxing unnecessary constraints because such constraints may increase a burden on computations by requiring trees that are otherwise unnecessary, so the EGBDT model can provide an improved approach to creating and conveying monotonicity constraints with better performance and often a reduced number of trees, as shown with respect to FIG. 10 below.

Figure 10:
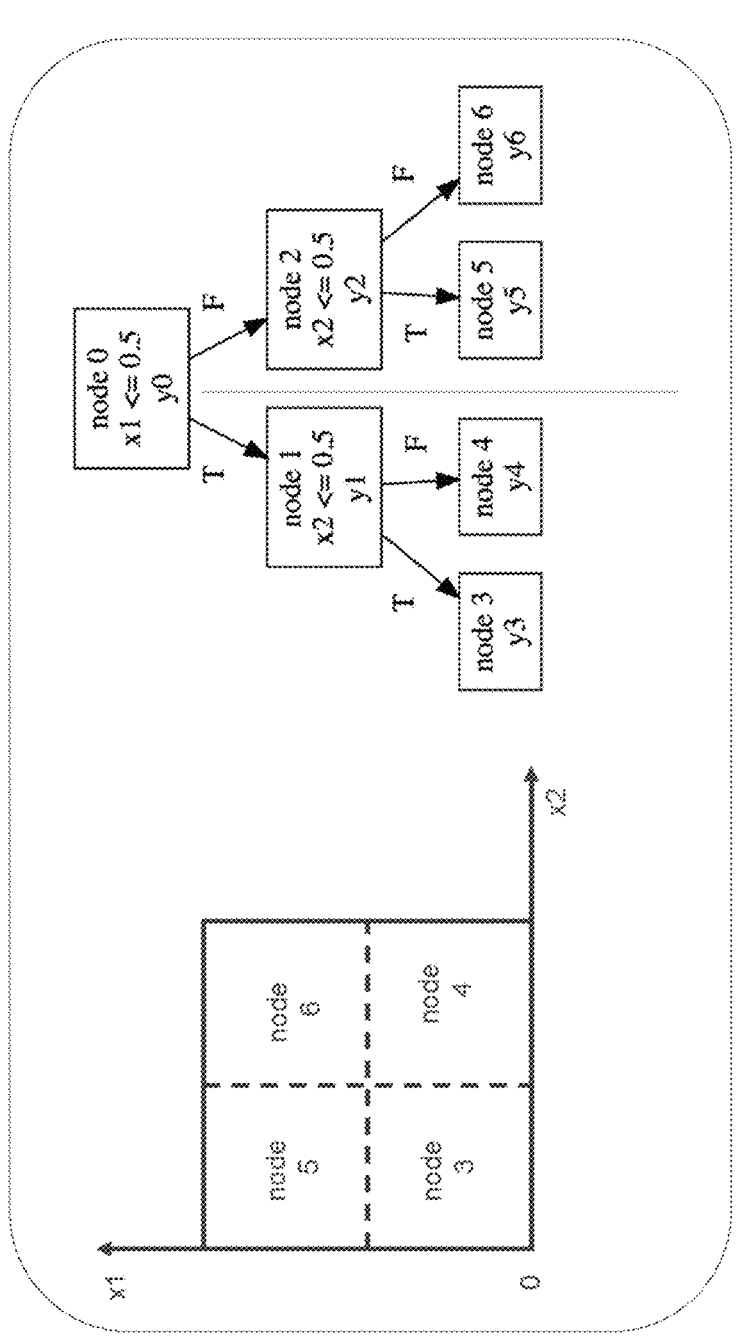
FIG. 10 depicts examples of EGBDT models that enable relaxed enforcement of constraints.

FIG. 10 is an example of EGBDT models enabling relaxed enforcement of constraints. In this depicted decision tree, only two variables, $x_1$ and $x_2$, are operated on. So effectively, the variables separate a two-dimensional space into different sub regions. The leftmost figure illustrates four sub regions created by the tree's four leaf nodes $y_3$, $y_4$, $y_5$, and $y_6$. The traditional GBDT will require $y_3 \leq y_4$, $y_5 \leq y_6$, $y_3 \leq y_5$, $y_4 \leq y_5$, $y_3 \leq y_6$, $y_4 \leq y_6$. But $y_4 \leq y_5$ is not necessary because points from these two sub regions differ on two different variables at the same time. In one example, the monotonicity constraint is only required on two inputs that differ on only one dimension (for example, when two consumers come in, if they are the same on all the dimensions except one, the consumer who behaves better on this dimension will receive better credit score). EGBDT provides options to remove such unnecessary constraints and allow the tree to be better optimized while still satisfying the monotonicity constraints.

Figure 11:
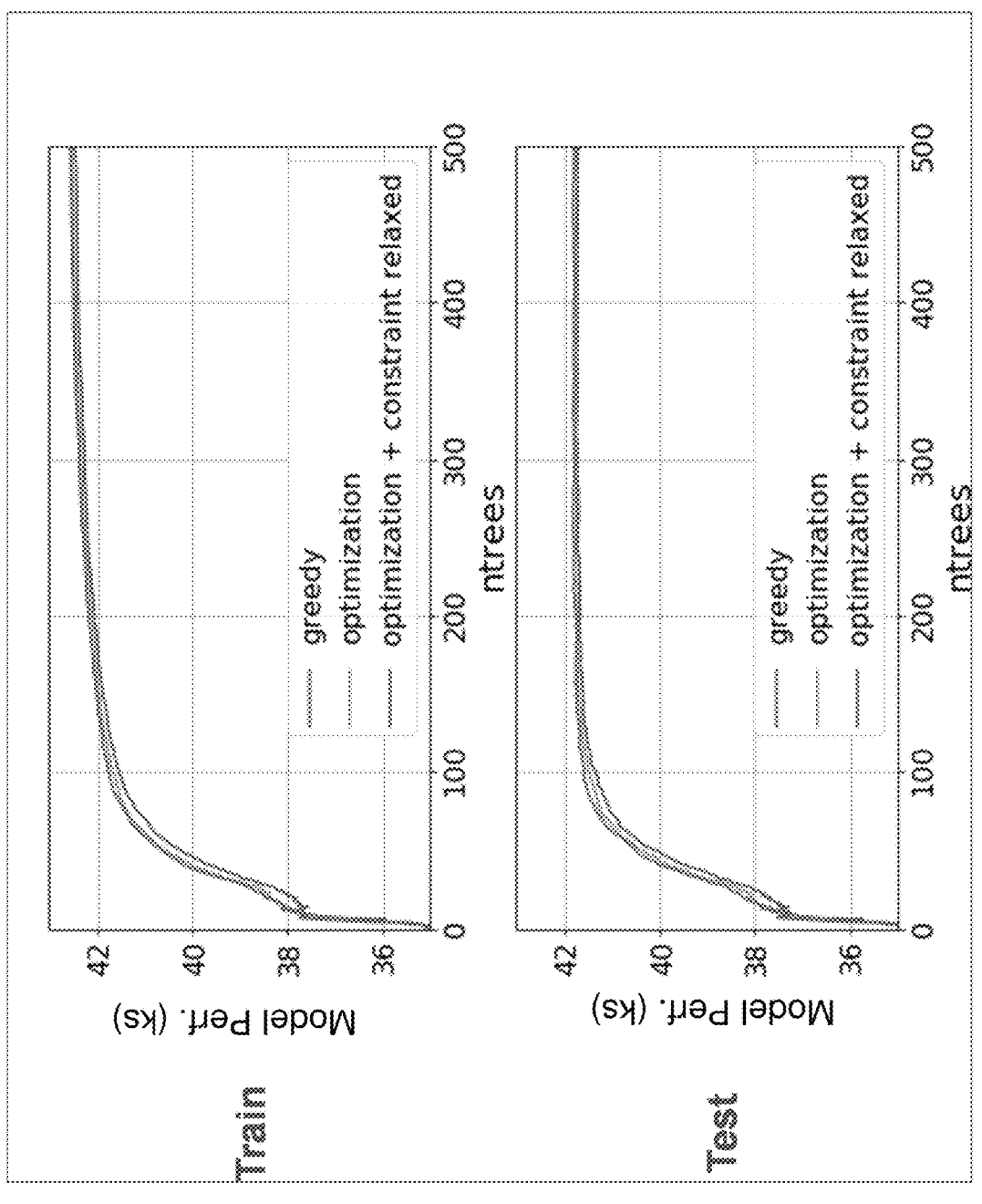
FIG. 11 is a comparison of performance benefits of traditional GDBT models and EGDBT models in testing and training phases.

The benefit of relaxing over constraints and leaf node target value optimization is listed in FIG. 11, which compares performance benefits of traditional GDBT models and EGBDT models in testing and training phases. Significant lift may be observed when the number of trees is small; lift reduces with more trees in the model; there was observed to be about a 0.5 KS (Komogrov-smornov) point lift on a holdout dataset on a credit risk modeling data set.

Furthermore, the EGBDT model may provide for valid value protection, which ensures that no special value has a higher score than predefined valid value or a lower score than certain predefined valid value. For example, for special value mapping, the EGBDT model may limit the special values such that the special values cannot be assigned a higher score than the best valid value score so that the special values need to be set to the best valid value. Also, the EGBDT model can selectively apply the best valid protection at an attribute level. For example, the EGBDT model can select a subset of attributes and apply the best valid protection. Unselected attributes may not be protected.

Furthermore, the EGBDT model may split the valid value range at predefined values, for example in response to an ingested file of split values or when splitting certain attributes during tree induction. The EGBDT model also may ingest a file identifying scores for the special values.

The GBDT model may also provide local variable importance, for example functions and/or methods of calculating variable importance for different records, samples, and/or data points. In some instances, the GBDT model may support Saabas values and SHAP values. In some embodiments, the ingested files (and the corresponding customized parameters) are selected by the user when making the request or interacting with the scorecard and/or GBDT models. In some embodiments, the ingested files also identify where output values (for example, the risk assessment) or a number of bins to create and so forth.

One advantage or benefit of building the scorecard model through or using the GBDT model is that the GBDT model scales efficiently and can handle very large datasets efficiently and effectively. For a training dataset with one million records and 3000 variables, the GBDT model may complete the training the scorecard model within a couple hours. Furthermore, the GBDT model may often only select a subset of the whole variables, which reduces the problem size for the optimization approach and the GBDT model may create supervised bin cuts on each variable, which can be utilized by the optimization approach as well, further improving computation costs, etc., associated with the scorecard model.

Scorecard Implementation

Figure 8:
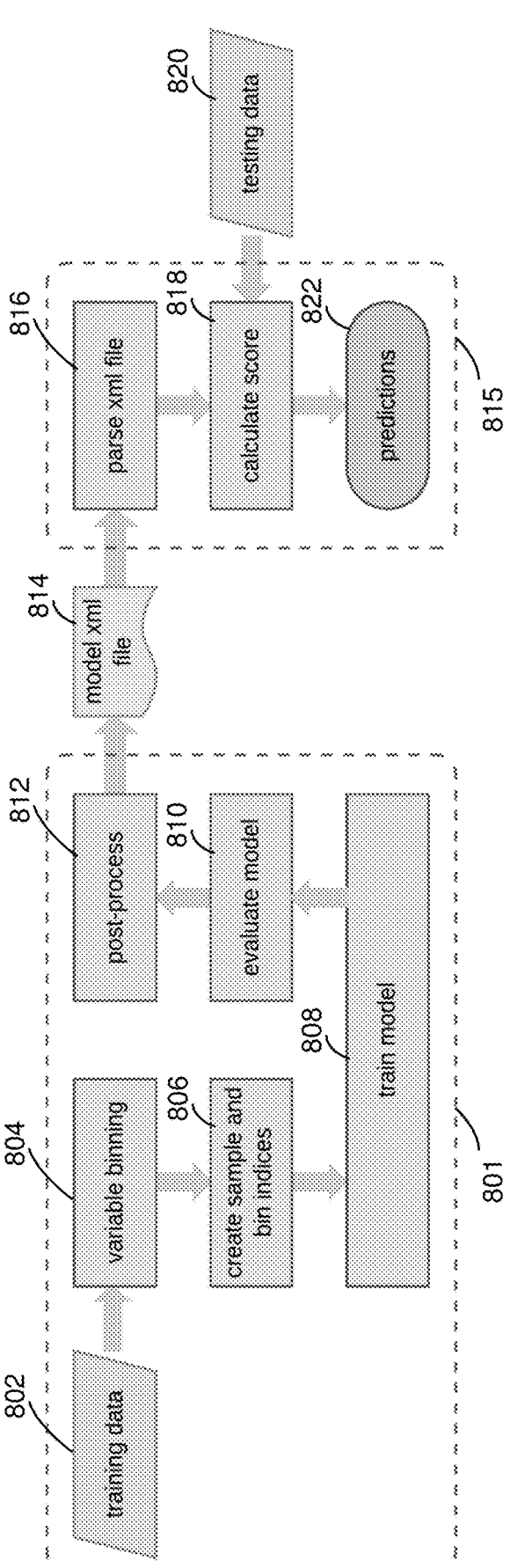
FIG. 8 provides a high-level illustration of a framework of a scorecard model, represented by a training process and scoring process associated therewith, according to some embodiments.

Once the scorecard model is trained as described above, the scorecard model can be applied to datasets to generate predictions or risk assessments, for example for credit defaults or other financial events, risk of contracting an illness or other healthcare events, or other societal risks. FIG. 8 provides a high-level illustration of the framework of the scorecard model 800, represented by a training process 801 and scoring process 815 associated therewith. The scorecard model 800 can be separated into two major components: a trainer 801 and a scorer 815, whose functionalities and workflows are described as follows. The framework of FIG. 8 may be performed or applied by the dynamic modeling system 103 or one of the computing devices 102 and/or 106 of FIG. 1.

The trainer 801 first performs binning on the input training dataset 802. The input training dataset 802 may include records from one or more data stores, for example, the data stores 104 and 108 of FIG. 1, or received via a separate communication over the network 110 or similar. The trainer 801 can perform the variable binning 804 using one or more standard binning methods, for example equal population binning or by the supervised binning method using the GBDT model as described above. Because the one-hot encoding inherited in the binning process significantly expands the number of model parameters, the trainer 801 may create sample and bin indices 806 according to a special indexing scheme for the samples and the bins, as described in the last section. With the proper indexing, the trainer 801 can perform multiplication among high-dimensional matrices and vectors in a significantly simplified manner when computing the gradient vector and the Hessian matrix for the training data to train the model at 808 (for example, using Equation 6, 13, and/or 16) and evaluate the model at 810. At post processing 812, the trainer 801 applies an objective function to the results from evaluating the model at 810. In some embodiments, a user (for example, an entity requesting a risk assessment) can pick the object function during training 808 from a list of objective functions, such as logistic loss, hinge loss, and mean squared error, among others. The user may also choose any combinations of the constraints and regularizations described herein as part of the training process 808.

Various methods and tools may numerically solve the optimization in Equation 16 and obtain a solution (for example, for calculating the weight/score of each bin that collectively minimize the objective function while satisfying all the constraints). A CVXOPT package or tool is a popular open source tool that can solve the type of optimization problem in Equation 16. In some embodiments, the CVXOPT package may internally implement an interior-point method to solve a general nonlinear convex program. The package may use a user-defined formula(s) for computing the objective function, the gradient vector, and/or the Hessian matrix. To efficiently optimize the model parameters, additional techniques described below may be used to speed up the calculation.

Additionally, or alternatively, the scorecard model supports an adaptive relaxed alternating direction method of multipliers (ARADMM) algorithm for optimization at training process 808 and solving the optimization in Equation 16. ARADMM is an alternative algorithmic option for solving the constrained optimization problem in Equation 16. The scorecard model herein includes implementation features to provide the user with the option to select between the interior-point algorithm and the ARADMM algorithm. The ARADMM algorithm is an iterative algorithm in that the solution is obtained via multiple iterations. Given an initial value of the iteration, the algorithm implements special formula to calculate the solution at a next step. In theory, a numerical solution thus obtained asymptotically converges to the true solution after a number of iterations. In practice, a criterion for the iterations to stop is established when the error between the actual numerical solution and the true solution is satisfactory. The scorecard model utilizing the ARADMM algorithm may employ a scheme that adaptively updates and/or calculates step size parameters for the ARADMM algorithm at each iteration of the ARADMM algorithm for the next iteration. However, the ARADMM algorithm has a reduced efficiency as compared to the interior-point method on a single machine environment. In a distributed system environment, efficiency gains may be obtained using the ARADMM algorithm.

The user may select which optimization method to apply (for example, one of the CVXOPT package and/or the ARADMM algorithm).

Once the optimization and post-processing is completed at 812, the trainer 801 outputs a single XML file 814, in some embodiments. It will be appreciated that file formats or data objects other than XML may be used in other embodiments. The XML file 814 may encapsulate all the important information of the scorecard model in a hierarchical structure. For example, the XML file 814 may include configuration parameters for model training, a list of variables ranked by their importance, and the parameters of all the bins (trained weight, boundaries, bad rate, good rate, and so forth). The list of variables may comprise input attributes used to make prediction. For example, for credit modeling, the list of variables could include current balance, past delinquency history, and so forth. Such variables may be contained in the modeling dataset. An optional post-processing operation in 812 is to merge adjacent bins whose weights are nearly identical. Such a step is particularly desirable when the binarsity or the L1 regularization is included for training 808 or evaluating 810 the scorecard model or for post-processing 812.

The scorer 815 may receiving the XML file 814 generated from the trainer 801 and parse the XML file at 816. The parsing of the XML file 814 may result in a restored scorecard model. At 818, the scorer 815 may apply the restored scorecard model to testing dataset 820. The testing dataset 820 may be received from one or more of the data stores 104 and/or 108 or from another source. The scorer 815 may then apply the restored scorecard model to the testing data 820 to generate one or more scores or prediction values for the testing dataset 822.

The scorecard model described herein, in some embodiments, may represent a class of linear machine learning models that may be suitable for risk prediction and decision-making problems. As an additive model, the prediction score of the scorecard model is calculated simply as the sum of the weight (also referred to herein as score) of each prescribed risk factor, leading to superior simplicity and explainability for the scorecard model when compared with more complex nonlinear models, such as neural networks. As introduced above, the scorecard models have been successfully applied to various industries, where simplicity and explainability are anticipated. In finance, the scorecard models can be employed for credit scoring, making lending decisions, and predicting risk (for example, default risk, delinquency risk, and so forth). Risk prediction problems to which scorecard models also arise in medical and healthcare problems, where the scorecard models described herein can assess the risk of illness or other events, for example stroke, ICU trips, seizures, and other medical or healthcare conditions. Within criminal justice systems, the scorecard models described herein can predict recidivism risk and similar risks.

As introduced above, the scorecard models described herein generate quick and interpretable predictions and decisions due to their simplicity. The described scorecard models can be further improved or simplified by cutting only a small number of bins or applying general discretization frameworks with bin merge and split schemes. In some embodiments, additional binning methods of clustering-based binning may be applied in the scoring models described herein. Furthermore, regularization based on a fused Lasso methodology may further minimize an absolute different of weights associated with adjacent variables or bins. The Lasso methodology may further assist scorecard models trained with insufficient samples and/or a large number of variables.

Computing Systems

Any of the components or systems described herein may be controlled by operating system software, such as Windows XP, Windows Vista, Windows 7, Windows 8, Windows Server, UNIX, Linux, SunOS, Solaris, IOS, Android, Blackberry OS, or other similar operating systems. In Macintosh systems, the operating system may be any available operating system, such as MAC OS X. In other embodiments, the components or systems described herein may be controlled by a proprietary operating system. Conventional operating systems control and schedule computer processes for execution, perform memory management, provide file system, networking, I/O services, and provide a user interface, such as a graphical user interface ("GUI"), among other things.

Computing devices, which may comprise the software and/or hardware described above, may be an end user computing device that comprises one or more processors able to execute programmatic instructions. Examples of such computing devices are a desktop computer workstation, a smart phone such as an Apple iPhone or an Android phone, a computer laptop, a tablet PC such as an iPad, Kindle, or Android tablet, a video game console, or any other device of a similar nature. In some embodiments, the computing devices may comprise a touch screen that allows a user to communicate input to the device using their finger(s) or a stylus on a display screen.

The computing devices may also comprise one or more client program applications, such as a mobile "app" (for example, iPhone or Android app) that may be used to visualize data, and initiate the sending and receiving of messages in the computing devices. This app may be distributed (for example downloaded) over the network to the computing devices directly or from various third parties such as an Apple iTunes or Google Play repository or "app store." In some embodiments, the application may comprise a set of visual interfaces that may comprise templates to display vehicle history reporting and financing information. In some embodiments, as described above, visual user interfaces may be downloaded from another server or service. This may comprise downloading web page or other HTTP/HTTPS data from a web server and rendering it through the "app". In some embodiments, no special "app" need be downloaded and the entire interface may be transmitted from a remote Internet server to computing device, such as transmission from a web server to an iPad, and rendered within the iPad's browser.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the system distinguishes between the initial transmission of loan application data required for user interfaces, and subsequent transmissions of user interface data so that it may transmit only portions that are necessary to update a vehicle history reporting and financing user interface. This may be done, for example, using an XMLHttpRequest (XHR) mechanism, a data push interface, Asynchronous Javascript and XML ("Ajax"), or other communication protocols.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process blocks may be stored, persistently or otherwise, in any type of non-transitory computer storage such as, for example, volatile or non-volatile storage.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or blocks in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the vehicle history reporting and financing system 100, marketing computing device 162, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The I/O devices and interfaces provide a communication interface to various external devices and systems. The computing system may be electronically coupled to a network, which comprises one or more of a LAN, WAN, the Internet, or cloud computing networks, for example, via a wired, wireless, or combination of wired and wireless, communication links. The network communicates with various systems or other systems via wired or wireless communication links, as well as various data sources.

Information may be provided to the system 100 over the network 110 from one or more data sources including, for example, the data stores 104 and/or 108 or internal source information database. In addition to the sources that are illustrated in FIG. 1, the network 110 may communicate with other data sources or other computing devices. The data sources may include one or more internal or external data sources. In some embodiments, one or more of the databases or data sources may be implemented using an open-source cross-platform document-oriented database program, such as a Mongo dB, a relational database, such as IBM DB2, Sybase, Oracle, CodeBase and Microsoft® SQL Server as well as other types of databases such as, for example, a flat file database, an entity-relationship database, and object-oriented database, and/or a record-based database.

It is recognized that the term "remote" may include systems, data, objects, devices, components, or modules not stored locally, that are not accessible via the local bus. Thus, remote data may include a system that is physically stored in the same room and connected to the computing system via a network. In other situations, a remote device may also be located in a separate geographic area, such as, for example, in a different location, country, and so forth.

ADDITIONAL EMBODIMENTS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following.

What is claimed is:

1. A system for generating risk assessment scores, the system comprising:

a data store including historical records regarding each of a number of individuals; and at least one physical processor programmed by instructions in a memory to:

receive, from a user system, a request for a risk assessment score for an individual;

based on parsing the received request, identify an identifier for the individual;

based on the identifier, obtain, from the data store, one or more historical records for the individual;

based on the received request, select a corresponding machine learning (ML) model, the selected ML model configured to manage a plurality of variables for use in generating the risk assessment score, wherein at least a subset of the plurality of variables are associated with information in the one or more historical records for the individual;

apply the selected ML model to the one or more historical records, wherein the selected ML model is trained using a gradient boosted decision tree comprising one-split stumps, one or more of the one-split stumps being constrained by monotonicity rules so that the selected ML model produces a transparent and interpretable scorecard representation, wherein the selected ML model is a scorecard ML model that, for each of the variables of the plurality of variables, automatically generates:

(a) normal bins for normal values of a variable of the variables that fall within a valid range of values for the variable; and (b) at least one special bin for special values of the variable that fall outside the valid range of values for the variable, wherein adjacent bins of the normal bins are separated by a threshold value and each normal bin and each special bin have an assigned score value;

based on the selected ML model, generate the risk assessment score for the individual, wherein the selected ML model generates the risk assessment score based at least in part on identifying the assigned value score for each of the plurality of variables based on the normal or special bin to which each individual variable of the plurality of variables is assigned;

generate an output comprising the risk assessment score; and cause transmission, to the user system, of the output.

2. The system of claim 1, wherein the risk assessment score represents a quantitative estimate of a probability that the individual will display a defined behavior as determined by the scorecard ML model based on identification of the normal or special bin to which each individual variable of the plurality of variables is assigned.

3. The system of claim 1, wherein the monotonicity rules are applied on the normal bins but not on the at least one special bin, where the monotonicity rules limit to one of non-increasing or non-decreasing changes in weights for each adjacent subsequent bin of the normal bins.

4. The system of claim 3, wherein the instructions further cause the physical processor to:

determine an explanation for the generated risk assessment score, wherein the explanation is determined based at least in part on identification of at least one of the normal bins to which an individual variable is assigned in view of the monotonicity rules, wherein the output further comprises the explanation for the generated risk assessment score.

5. The system of claim 1, wherein the instructions further cause the physical processor to implement binarsity regularization that causes the scorecard ML model to penalize a difference in weights associated with at least one pair of adjacent normal bins.

6. The system of claim 5, wherein the scorecard ML model combines two or more neighboring bins based at least in part on the binarsity regularization.

7. The system of claim 1, wherein automatically generating the normal bins comprises applying one of equal-sized binning or quantile-based binning within the valid range of values for the variable.

8. The system of claim 1, wherein the instructions further cause the physical processor to implement a U-shaped constraint for at least one variable, wherein implementing the U-shaped constraint comprises the scorecard ML model splitting the at least one variable into two virtual variables or sub-variables that are separately analyzed by the scorecard ML model.

9. The system of claim 1, wherein the processor is further configured to, prior to causing transmission:

generate, together with the risk assessment score, an explanation identifying the variables and bins that contributed to the score; and update the output to include the explanation.

10. A computer-implemented method for optimizing binning in a scorecard machine learning (ML) model, the computer-implemented method comprising:

receiving, from a user system, a request for a risk assessment score for an individual;

based on parsing the received request, identifying an identifier for the individual;

based on the identifier, obtaining, from a networked data store, one or more historical records for the individual;

identifying, for a first ML model to be applied to generate the risk assessment score, a variable for which a plurality of bins are to be generated, the variable having a valid range within which normal bins of the plurality of bins are defined and outside of which at least one special bin of the plurality of bins is defined;

applying a second ML model to the variable based on generating at least one split value for the valid range, wherein generating each of the at least one split value comprises generating a single level decision tree for the split value and enforcing monotonicity with respect to the generated single level decision for each of the at least one split value in the valid range;

generating the normal bins for the valid range based at least in part on the generated at least one split value;

applying a binarsity regularization term that penalizes large differences in weights between adjacent bins, so that bins with substantially similar weights are merged together to improve stability of the scorecard ML model;

generating the at least one special bin to include one or more special values of the variable;

generating the risk assessment score based on applying the first ML model to the one or more historical records using the generated normal bins and the generated at least one special bin;

generating an output comprising the generated risk assessment score; and cause transmission, to the user system, of the output.

11. The computer-implemented method of claim 10, wherein the single level decision tree comprises a one-split tree with only two leaf nodes.

12. The computer-implemented method of claim 10, wherein the second ML model is trained at least in part by utilizing a gradient boosting decision tree algorithm employing stumps.

13. The computer-implemented method of claim 12, wherein the second ML model enforces monotonicity constraints on the stumps, wherein enforcing the monotonicity constraints on the stumps comprises ignoring candidate splits on which a monotonicity constraint is violated.

14. The computer-implemented method of claim 10 further comprising treating multiple special values as a categorical variable.

15. The computer-implemented method of claim 14 further comprising enabling a plurality of special values falling within the categorical variable to be placed on either a left side or right side of a split point in a tree.

16. A computer-implemented method for generating risk assessment scores, the computer-implemented method comprising:

receiving, from a user system, a request for a risk assessment score for an individual;

based on parsing the received request, identifying an identifier for the individual;

based on the identifier, obtaining one or more historical records for the individual;

selecting a corresponding machine learning (ML) model, the selected ML model configured to manage a plurality of variables for use in generating the risk assessment score, wherein at least a subset of the plurality of variables are associated with information in the one or more historical records for the individual;

applying the selected ML model to the one or more historical records, wherein the selected ML model is a scorecard ML model trained using a gradient boosted decision tree built from one-split stumps, one or more of the one-split stumps being constrained by monotonicity rules so that the selected ML model produces a transparent and interpretable scorecard representation, wherein the scorecard ML model that, for each of the variables of the plurality of variables, automatically generates:

(a) normal bins for normal values of a variable of the variables that fall within a valid range of values for the variable; and (b) at least one special bin for special values of the variable that fall outside the valid range of values for the variable, wherein adjacent bins of the normal bins are separated by a threshold value and each normal bin and each special bin have an assigned score value;

generating the risk assessment score for the individual based on the selected ML model, wherein the selected ML model generates the risk assessment score based at least in part on identifying the assigned value score for each of the plurality of variables based on the normal or special bin to which each individual variable of the plurality of variables is assigned;

generating an output comprising the risk assessment score; and causing transmission, to the user system, of the output.

17. The computer-implemented method of claim 16, wherein the monotonicity rules are applied on the normal bins but not on the at least one special bin, where the monotonicity rules limit to one of non-increasing or non-decreasing changes in weights for each adjacent subsequent bin.

18. The computer-implemented method of claim 16 further comprising:

determining an explanation for the generated risk assessment score, wherein the explanation is determined based at least in part on identification of at least one of the normal bins to which an individual variable is assigned in view of the monotonicity rules, wherein the output further comprises the explanation for the generated risk assessment score.

19. The computer-implemented method of claim 16, wherein generating the normal bins comprises applying one of equal-sized binning or quantile-based binning within the valid range of values for the variable.

20. The computer-implemented method of claim 16 further comprising implementing a U-shaped constraint for at least one variable, wherein implementing the U-shaped constraint comprises the scorecard ML model splitting the at least one variable into two virtual variables or sub-variables that are separately analyzed by the scorecard ML model.

* * * * *